US012103832B2

(12) United States Patent
Schlabach

(10) Patent No.: US 12,103,832 B2
(45) **Date of Patent: *Oct. 1, 2024**

(54) METHOD AND APPARATUS FOR CONNECTING AND MOVING OBJECTS

(71) Applicant: NORDEN MFG LLC, North Bloomfield, OH (US)

(72) Inventor: Willard Schlabach, Sullivan, IL (US)

(73) Assignee: Norden Mfg LLC, North Bloomfield, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,793

(22) Filed: Mar. 3, 2023

(65) Prior Publication Data

US 2023/0219795 A1 Jul. 13, 2023

Related U.S. Application Data

(63) Continuation-in-part of application No. 17/307,406, filed on May 4, 2021, now Pat. No. 11,618,659, which is a continuation of application No. 17/100,275, filed on Nov. 20, 2020, now Pat. No. 11,623,849.

(60) Provisional application No. 63/043,987, filed on Jun. 25, 2020.

(51) Int. Cl.
*B66F 9/07* (2006.01)
*B66F 9/075* (2006.01)
*B66F 9/18* (2006.01)

(52) U.S. Cl.
CPC ............ *B66F 9/07504* (2013.01); *B66F 9/18* (2013.01)

(58) Field of Classification Search
CPC ........ B66F 9/12; B66F 9/127; B66F 9/07504; B66F 9/18
See application file for complete search history.

(56) References Cited

U.S. PATENT DOCUMENTS 2,957,594 A * 10/1960 Brenneman ............. B66F 9/147 414/785
3,258,146 A * 6/1966 Hamilton .................. B66F 9/12 414/427
3,809,264 A 5/1974 Mayers
4,049,146 A * 9/1977 Decker .............. B62D 53/0828 414/607
4,065,013 A 12/1977 Orthman
4,824,317 A 4/1989 Schroder
(Continued)

*Primary Examiner* — Gregory W Adams
(74) *Attorney, Agent, or Firm* — Sand, Sebolt & Wernow Co., LPA

(57) ABSTRACT

A method and apparatus for moving objects between locations using a moving apparatus coupled to a lifting device, such as a forklift. The moving apparatus is engageable with the lifting device when seated on a surface and is secured to the lifting device by a retaining assembly when the lifting device lifts the moving apparatus off the surface. The moving device includes a connector assembly which is used to retain or secure an object, article, or piece of equipment to the moving apparatus. The connector assembly may be any suitable hitch-type apparatus such as a standard ball hitch or a gooseneck hitch. In other embodiments, the connector assembly may include a platform which is rotatably mounted to a body of the moving apparatus. The platform defines a platform channel into which a portion of the object, article, or piece of equipment is received.

19 Claims, 19 Drawing Sheets

(56) References Cited

U.S. PATENT DOCUMENTS

| | | | | | |
|---|---|---|---|---|---|
| 5,096,018 | A * | 3/1992 | Dickinson, Jr. | B66F 9/127 | 182/69.6 |
| 5,433,493 | A | 7/1995 | Dix et al. | | |
| 6,015,255 | A * | 1/2000 | Vander Meer | B66F 9/18 | 414/785 |
| 6,135,701 | A * | 10/2000 | Galloway, Sr. | B66F 9/18 | 280/415.1 |
| 7,597,526 | B2 | 10/2009 | Benson | | |
| 8,104,783 | B2 | 1/2012 | Blankenship et al. | | |
| 8,684,655 | B2 | 4/2014 | Cannon | | |
| 9,371,685 | B2 | 6/2016 | Cooper et al. | | |
| 10,214,401 | B2 * | 2/2019 | Brunckhorst | B66F 9/18 | |
| 11,618,659 | B2 * | 4/2023 | Schlabach | B66F 9/07504 | 187/222 |
| 11,623,849 | B2 * | 4/2023 | Schlabach | B66F 9/18 | 187/222 |
| 2003/0034483 | A1 * | 2/2003 | Anderson | B66F 3/42 | 254/7 B |

* cited by examiner

METHOD AND APPARATUS FOR CONNECTING AND MOVING OBJECTS

REFERENCE TO RELATED APPLICATIONS

This application is a Continuation-in-Part of U.S. application Ser. No. 17/307,406 filed May 4, 2021, which is a Continuation of U.S. application Ser. No. 17/100,275 filed Nov. 20, 2020, which application claims the benefit of U.S. Provisional Patent Application Ser. No. 63/043,987 filed Jun. 25, 2020, the entire disclosures of which are incorporated herein by reference.

TECHNICAL FIELD

Generally, the disclosure relates to a method and apparatus for moving articles, objects, or equipment between a first location and a second location. More particularly, the disclosure relates to a method and apparatus for moving articles, objects, or equipment using a forklift or other similar lifting device. Specifically, the disclosure relates to a moving apparatus capable of being operatively coupled to a forklift or similar vehicle when the moving apparatus is on the ground, and is then secured to the lifting device when lifted off the ground. A connector assembly couples the object, article, or equipment to the moving apparatus. The connector assembly may include a pyramidal frame for enabling engagement of a gooseneck-type hitch or a five slider attached to the object, article, or equipment; a hitch frame for enabling engagement of different dimension ball hitches provided on articles, objects, or equipment; and a rotatable platform defining a platform channel into which part of the object, article or equipment is receivable.

BACKGROUND ART

In some industries it is needful to move large objects, equipment, or articles from one location to another on factory floors, inside large warehouses, or in commercial storage or display areas. Often these articles have to be moved around the yard or building, be loaded or unloaded, or otherwise moved into or out of position a number of times in a day or in a week. Forklifts are frequently used for this type of task. However, forklifts are typically only useable if the objects, equipment or articles to be moved (generally described herein by the term "articles") are located on a pallet or skid. The tines of the forklift can be received within channels defined in the pallet or skid and the stacked pallet or skid can then be moved from one location to another. When the articles to be moved are not supported on pallets or skids, forklifts may not be able to be used to move those articles. In these instances, vehicles such as trucks, trailers, and other types of moving equipment have to be used instead. However, trucks, cars, and cranes are far less maneuverable than forklifts. Consequently, a need exists for a way to engage articles which are not on pallets or skids to a forklift.

The prior art describes a variety of attachments which can be used to operatively engage articles to forklifts.

Orthman (U.S. Pat. No. 4,065,013) discloses an attachment for a forklift having a frame which defines sleeves configured to receive the tines of the forklift therein. A stop member on the frame is rotated into a locking position to secure the frame to the forklift tines. The frame also includes hitch hooks and pins which enable three-point mounted equipment to be operably engaged with the forklift via the attachment. Once the three-point equipment is engaged with the hitch hooks and pins of the attachment, the forklift is operable to manipulate the attachment and thereby the three-point mounted equipment and move the same from one location to another.

Schroder (U.S. Pat. No. 4,824,317) discloses a forklift extension having a frame which defines channels to receive the tines of a forklift. One or more arms provided on the frame are pivoted into a locking position to hold and secure the extension to the forklift. The extension includes auxiliary extension tines which can be mounted directly to the frame at a desired location to engage articles.

Cooper et al. (U.S. Pat. No. 9,371,685) discloses an attachment which is engageable with a forklift and is configured to be useful for hanging doors. The attachment includes a lifter mount having a frame defining channels into which the tines of a forklift are received. A retaining device in the form of a rotatable bolt is provided on the frame to lock the tines in place once received in the channels. A plate is welded to the frame of the lifter mount at a position remote from where the tines are received into the channels. A plate provided on a door mounting frame is selectively secured to the plate on the lifter mount via a nut and bolt. A door is able to be engaged with the door mounting frame and the forklift is used to manipulate the door mounting frame via the lifter mount to suitably position the door in the door mounting frame for hanging.

SUMMARY OF THE INVENTION

The method and apparatus described herein relates to a moving apparatus which is selectively engageable with a forklift or other lifting device and is configured to directly engage an object, article, or piece of equipment, so that the article can be quickly and easily moved from one location to another by the forklift or other lifting device. The moving apparatus is engageable with the lifting device when seated on a surface and is secured to the lifting device by a retaining assembly when the lifting device lifts the moving apparatus off the surface. The moving device includes a connector assembly which is used to retain or secure an object, article, or piece of equipment to the moving apparatus. The connector assembly may be any suitable hitch-type apparatus such as a standard ball hitch or a gooseneck hitch. In other embodiments, the connector assembly may include a platform which is rotatably mounted to a body of the moving apparatus. The platform defines a platform channel into which a portion of the object, article, or piece of equipment is received.

In one aspect, an exemplary embodiment of the present disclosure may provide a moving apparatus for engagement with a lifting device to move an article from a first location to a second location, said moving apparatus comprising a body having a first end and a second end defining a longitudinal direction therebetween; at least one channel member provided on the body, said at least one channel member extending in the longitudinal direction; a guided channel defined by the at least one channel member; a retaining assembly engaged with the at least one channel member and being operable to secure the body to the lifting device; and a connector assembly provided on the body, said connector assembly comprising a platform rotatable about a pivot axis, wherein the platform is adapted to engage the article to be moved.

In one embodiment, the connector assembly may further comprise a connector frame engaged with the at least one channel member; and wherein the platform is rotatable relative to the connector frame. In one embodiment, the platform may be located vertically above the connector frame. In one embodiment, the connector assembly may further comprise a pivot rod extending between the connector frame and the platform, and wherein the pivot axis extends along a shaft of the pivot rod. In one embodiment, the pivot axis may be oriented at ninety degrees relative to a longitudinal axis of the at least one channel member, and the longitudinal axis extends between a first end and a second end of the at least one channel member. In one embodiment, the platform may be U-shaped in cross-section and defines a platform channel therein, and wherein the platform channel is adapted to receive a portion of the article to be moved therein.

In one embodiment, the moving apparatus may further comprise an opening to the guided channel defined in a front end of the at least one channel member, and wherein the guided channel is adapted to receive a tine of the lifting device therein through the opening. In one embodiment, the retaining assembly may be movable between an accepting position and an engaged position; wherein when the retaining assembly is in the accepting position, the guided channel is adapted to removably accept a tine of the lifting device therein; and wherein when the retaining assembly is in the engaged position, the tine of the lifting device is retained in the guided channel and the body is secured to the lifting device. In one embodiment, the moving apparatus may further comprise a biasing assembly engaged with the retaining assembly, wherein said biasing assembly urges the retaining assembly into the engaged position.

In one embodiment, the retaining assembly may comprise at least one arm member having a base positionable a distance outwardly beyond a front end of the at least one channel member, wherein the base is located below an opening to the guided channel when the retaining assembly is in the accepting position and the base is located above an imaginary plane extending along a top wall of the at least one channel member when the retaining assembly is in the engaged position. In one embodiment, the retaining assembly may further comprise a leg extending outwardly from one end of the base, wherein the leg is V-shaped and an apex of the V-shaped leg is pivotally secured to the at least one channel member.

In another aspect, an exemplary embodiment of the present disclosure may provide a moving apparatus for engagement with a lifting device to move an article from a first location to a second location, said moving apparatus comprising a body including a first channel member and a second channel spaced laterally apart from one another, wherein each of the first channel member and second channel member has a first end and a second end spaced longitudinally apart from one another, and wherein the body is adapted to be engaged with the lifting device; a retaining assembly engageable with the body and operable to secure the body to the lifting device once the body is engaged with the lifting device; a connector assembly comprising a connector frame extending laterally between the first channel member and the second channel member; and a platform rotatably engaged with the connector frame, said platform being adapted to engage the article to be moved.

In one embodiment, the platform may be located vertically above the connector frame. In one embodiment, the connector assembly may further comprise a pivot rod oriented at ninety degrees relative to an upper surface of the platform. In one embodiment, the platform may be rotatable relative to the connector frame about a pivot axis extending at ninety degrees relative to a longitudinal axis of the first channel member, where the longitudinal axis extends between the first end and second end of the first channel member. In one embodiment, the platform may define a platform channel therein which opens upwardly away from an upper surface of the platform, and wherein the platform channel is adapted to receive at least a portion of the article to be moved therein.

In another aspect, and exemplary embodiment of the present disclosure may provide a method a moving an article from a first location to a second location with a lifting device, said method comprising placing a moving apparatus onto a surface at the first location; receiving a portion of the article to be moved within a platform channel defined by a platform that is rotatably engaged with a body of the moving apparatus; lifting the moving apparatus off the surface with the lifting device; moving a retaining assembly on the body of the moving apparatus from an accepting position to an engaged position as the moving apparatus lifts off the surface; securing the body of the moving apparatus to the lifting device with the retaining assembly; moving the lifting device from the first location to the second location; and moving the article from the first location to the second location with the moving apparatus while secured to the lifting device and while held a distance above the surface.

In one embodiment, the method may further comprise rotating the platform relative to a connector frame of the body of the moving apparatus, wherein the connector frame is engaged with the at least one channel member; and orienting the platform to a desired position relative to the connector frame in order to suitably accept the portion of the article therein. In one embodiment, the method may further comprise rotating the platform about a pivot axis oriented at ninety degrees relative to an upper surface of the platform which defines the platform channel. In one embodiment, the method may further comprise lowering the moving apparatus back into contact with the surface at the second location; moving the retaining assembly from the engaged position to the accepting position as the moving apparatus is lowered back into contact with the surface; releasing the body of the moving apparatus from the lifting apparatus as the retaining assembly moves to the accepting position; and removing the article from the moving apparatus by lifting the portion of the article from within the platform channel defined by the rotatable platform.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

A first embodiment of a new moving apparatus 10 and method of operation thereof is depicted in the present disclosure and throughout FIGS. 1-10B. A second embodiment of the new moving apparatus and method of operation thereof is depicted in the present disclosure and throughout FIGS. 11-14.

The disclosure focuses on an improved moving apparatus that may be used in conjunction with a common forklift, or otherwise a lifting device, as will be discussed hereafter.

Figure 1:
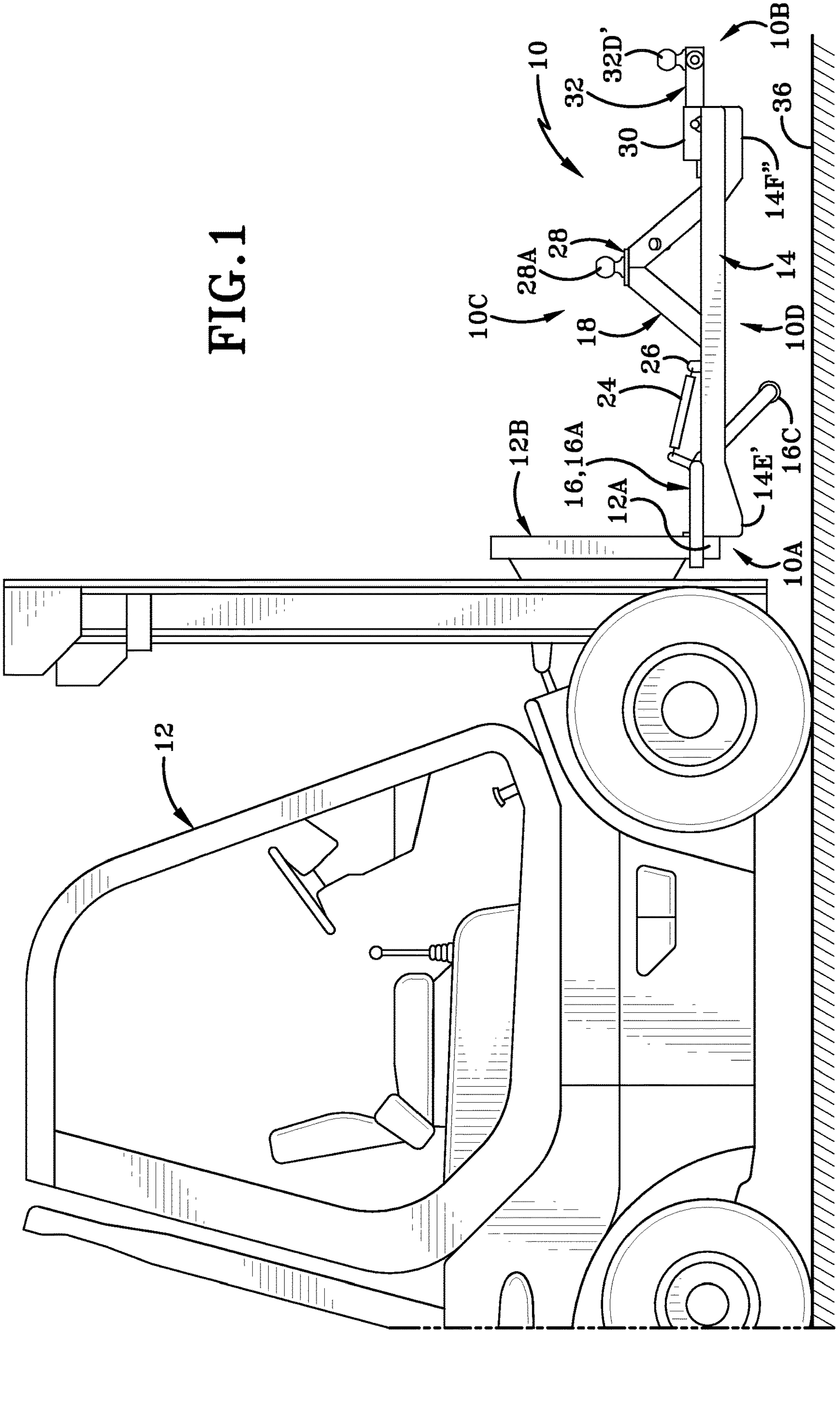
FIG. 1 is a left side elevation view of a first embodiment of a moving apparatus in accordance with the present disclosure shown engaged with a forklift.

Referring specifically to FIG. 1, an operational view of a first embodiment of the moving apparatus 10 is shown. The moving apparatus 10 is operative to be engaged with a lifting device and is used to secure an object, article or piece of equipment to the lifting device so that the object, article, or equipment can be moved from one location to another by the lifting device. As illustrated in the attached figures, moving apparatus is engaged a forklift 12. In particular, the tines 12A (or forks) of the forklift 12 are engaged with the moving apparatus 10. The forklift 12 has a carriage 12B which may be raised or lowered relative to a surface, such as the ground and when moving apparatus 10 is engaged with the tines 12A, the moving apparatus 10 may be raised or lowered relative to the surface via the forklift carriage 12B and tines 12A. When an object, article, or piece of equipment is engaged with the moving apparatus 10, then that object, article, or piece of equipment will be raised or lowered relative to the surface via the moving apparatus 10 while engaged with the lifting device. While a forklift 12 is shown as the lifting device (also referred to herein as the operating vehicle or vehicle), which engages moving apparatus 10 and manipulates the same, it should be understood that if lighter weight articles, objects, or equipment needs to be moved, then moving apparatus 10 may be engaged with another type of lifting equipment such as a pallet stacker or a pallet jack.

Figure 2:
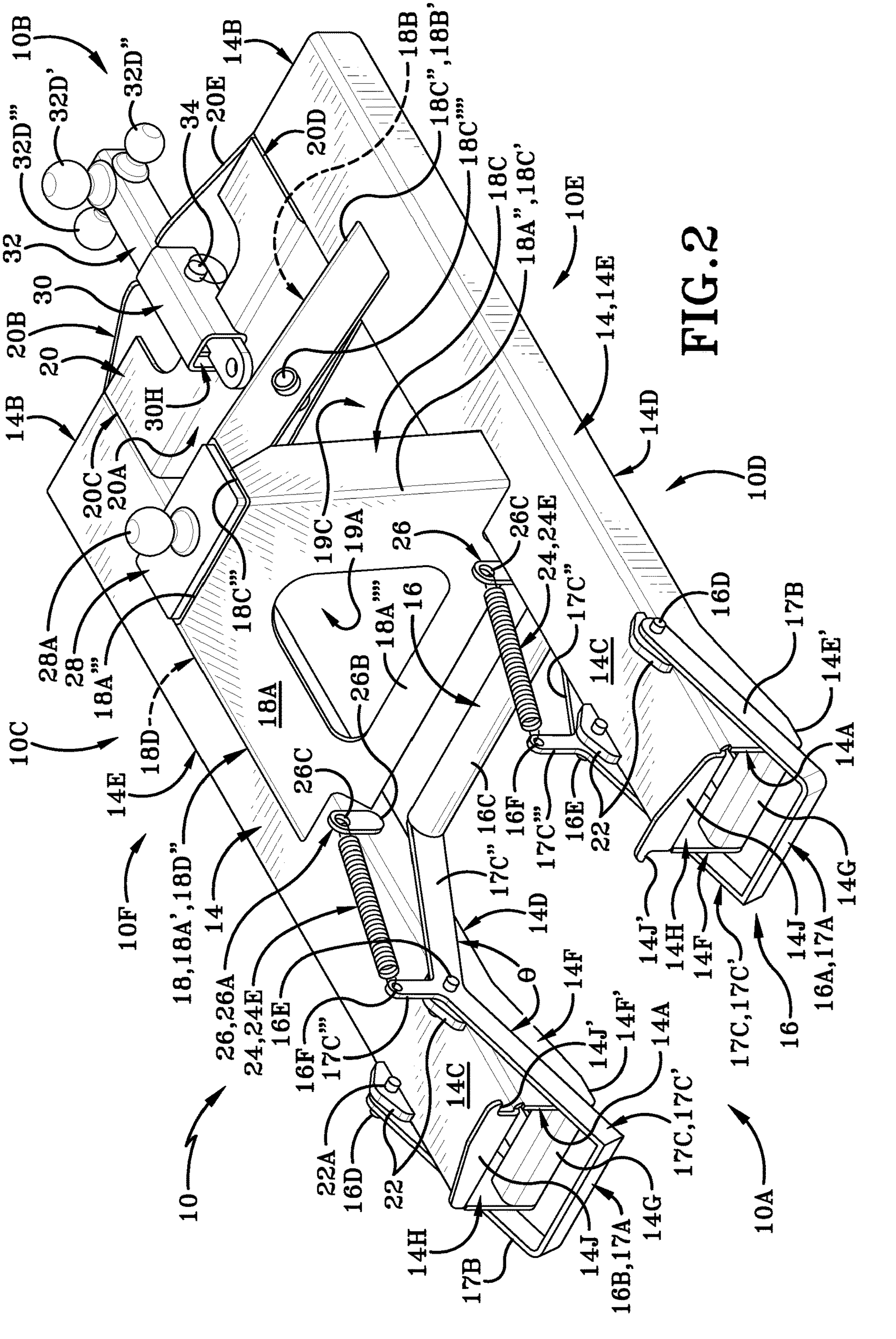
FIG. 2 is a front, top right side isometric perspective view of the moving apparatus in accordance with the present disclosure shown in isolation.
Figure 2A:
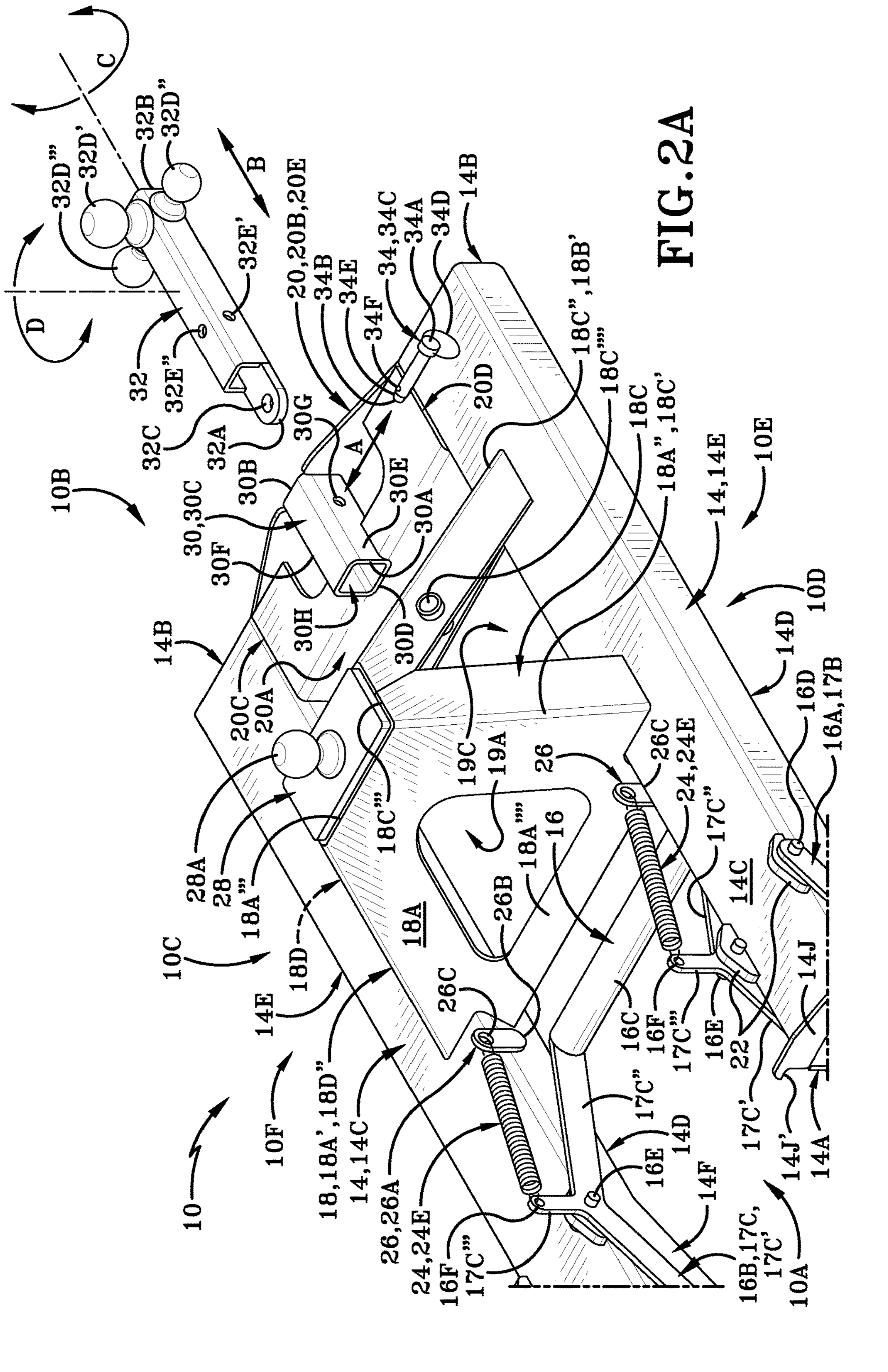
FIG. 2A is a partial exploded front, top, right side isometric perspective view of the moving apparatus shown in FIG. 2.

Referring specifically to FIG. 2 and FIG. 2A, isometric perspective views of the moving apparatus 10 are shown. The forklift is omitted from these figures. The moving apparatus 10 is illustrated as if it were in contact with the ground or other surface (not shown in these figures). The moving apparatus 10 comprises a body which generally includes two channel members 14 and a retaining assembly 16 engaged therewith. The retaining assembly 16 comprises a first arm member 16A, a second arm member 16B, and a crossbar 16C. The first arm member 16A is engaged with a first of the two channel members 14, the second arm member 16B is engaged with a second of the two channel members 14, and the crossbar 16C extends between the two arm members.

The body of moving apparatus 10 further includes two different types of connector assembly which are useful for attaching an object, article, or piece of equipment to the moving apparatus 10. The two different types of connector assembly include a pyramidal frame 18 and a hitch frame 20. The pyramidal frame 18 is suitable for enabling an object, article or piece of equipment to be engaged with moving apparatus 10 via a gooseneck-type hitch or a five slider (via the use of an adapter). Hitch frame 20 is suitable for enabling an object, article, or piece of equipment to be engaged with the moving apparatus 10 via a standard ball hitch. Each of the components of the channel members 14, retaining assembly 16, pyramidal frame 18, and the hitch frame 20 and the method of use thereof will be described in greater detail later herein.

The moving apparatus 10 generally has a front 10A and a rear end 10B spaced longitudinally from one another and defining a longitudinally direction therebetween. (The front 10A is that side of the moving apparatus 10 which will be approached by a person when driving a forklift forward to engage the moving apparatus.) The moving apparatus 10 further includes is a top 10C and a bottom 10D opposed thereto. The top 10C and bottom 10D define a vertical direction therebetween. The moving apparatus 10 further includes a first side 10E and a second side 10F opposed thereto. The first side 10E and 10F are laterally spaced from one another and define a lateral direction therebetween.

Figure 3:
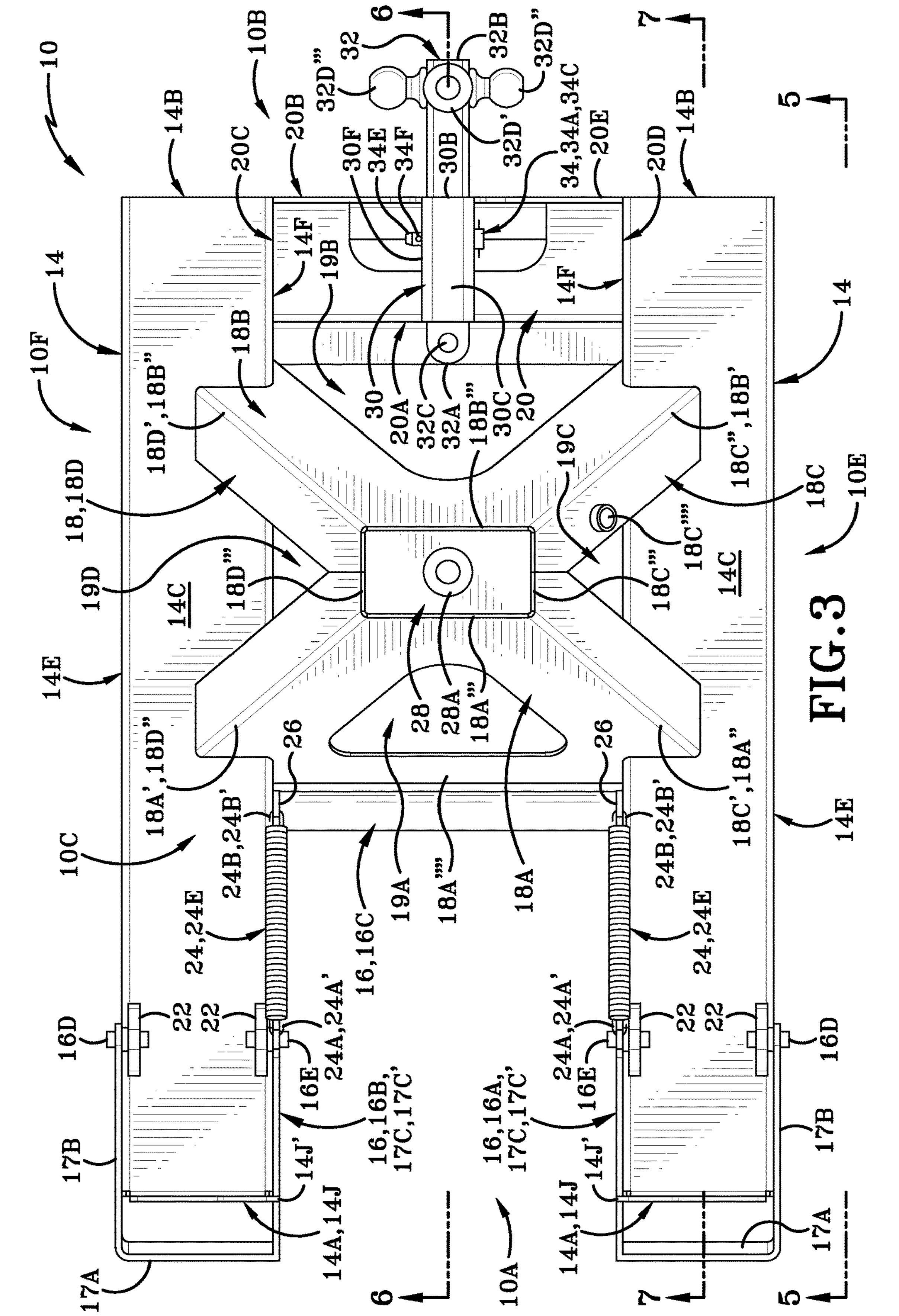
FIG. 3 is a top plan view of the moving apparatus shown in FIG. 2.
Figure 4:
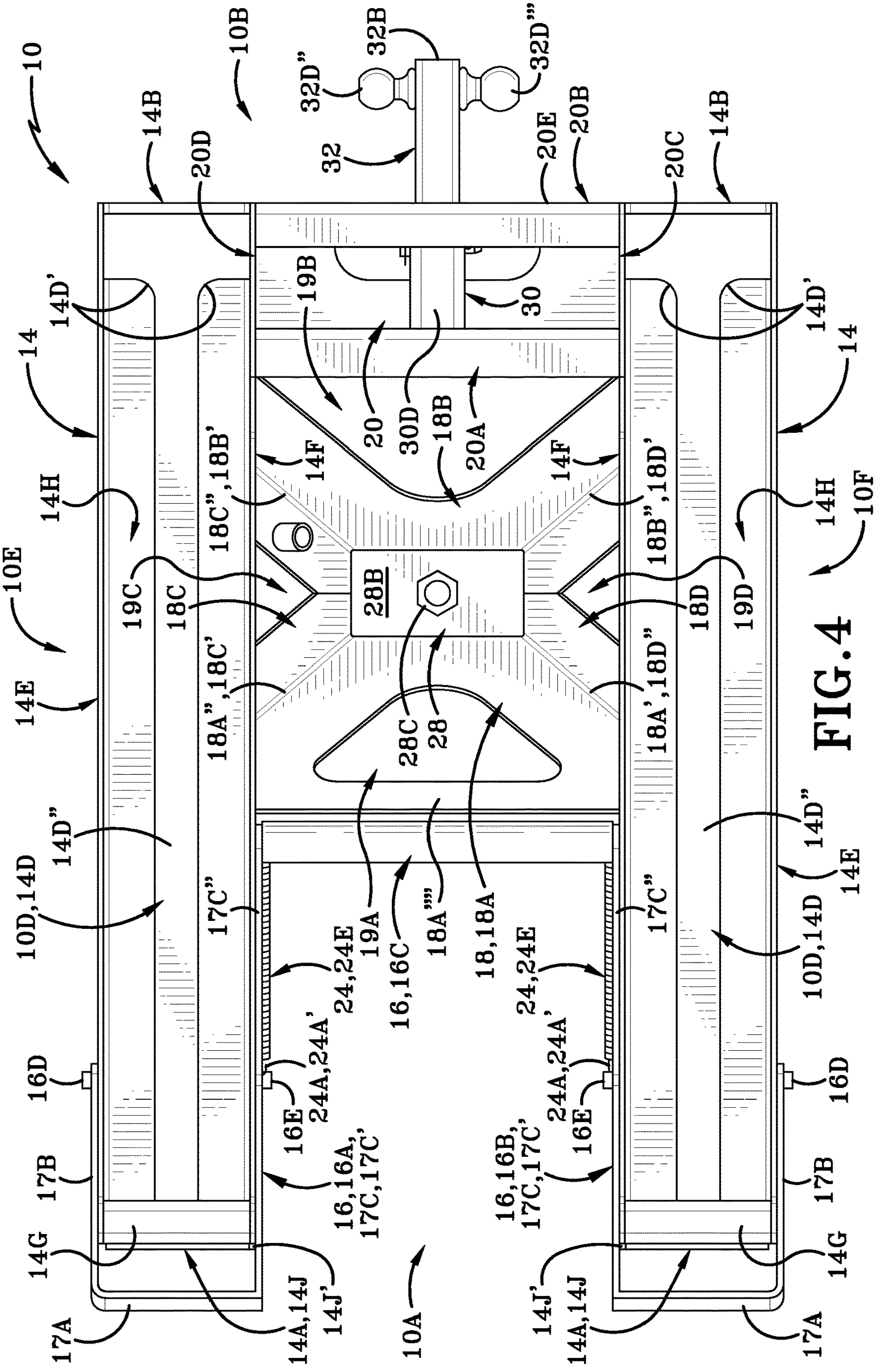
FIG. 4 is a bottom plan view of the moving apparatus.

The two channel members 14 are substantially identical in structure and function and are arranged as mirror images of one another about an imaginary midline "ML" (FIG. 4) of the body of moving apparatus 10. As such, identical parts of the two channel members 14 will be referred to herein and in the attached figures by identical reference numbers. Referring to FIGS. 2-4, each channel member 14 comprises a body which is a rectangular cuboid in shape, having a front end 14A and a rear end 14B. Channel members 14 are oriented substantially longitudinally and are laterally spaced a distance apart from one another. Channel members 14 are furthermore arranged parallel to one another, with the front ends 14A in lateral alignment with one another and with the rear ends 14B in lateral alignment. The body of each channel member 14 further includes a top wall 14C (FIG. 3) and a bottom wall 14D (FIG. 4) opposed to one another, and an outer wall 14E and an inner wall 14F opposed to one another. Top walls 14C of the two channel members 14 are horizontally aligned with one another and the bottom walls 14D thereof are also horizontally aligned with one another. Top wall 14C is substantially planar along its length from front end 14A to rear end 14B thereof such that the entire top wall 14C is arranged in a same plane. Bottom wall 14D is also substantially planar along its length from front end 14A to rear end 14B thereof but, as best seen in FIG. 4, is substantially T-shaped when viewed from below. Specifically, proximate rear end 14B of the channel member 14, bottom wall 14D includes a region which spans the entire width of the top wall 14A before tapering, with a pair of arcuate surfaces 14D', to a strip portion 14D". Strip portion 14D" runs for substantially the entire length of top wall 14C, terminating proximate front end 14A thereof. As shown in FIG. 4, the strip portion 14D" of bottom wall is of a reduced width relative to the top wall 14C other than the portion of bottom wall 14D proximate rear end 14B. This configuration of bottom wall 14D results in open gaps being defined in the bottom of channel member 14, with those gaps being located on either side of the strip portion 14D". This configuration of bottom wall 14D reduces the overall weight of each channel member 14 and thereby of moving apparatus 10, while still providing sufficient structural integrity to moving apparatus 10. It will be understood that in other embodiments, a full width bottom wall may be provided or some other configuration to reduce the overall weight of channel member 14 may be utilized.

Figure 5:
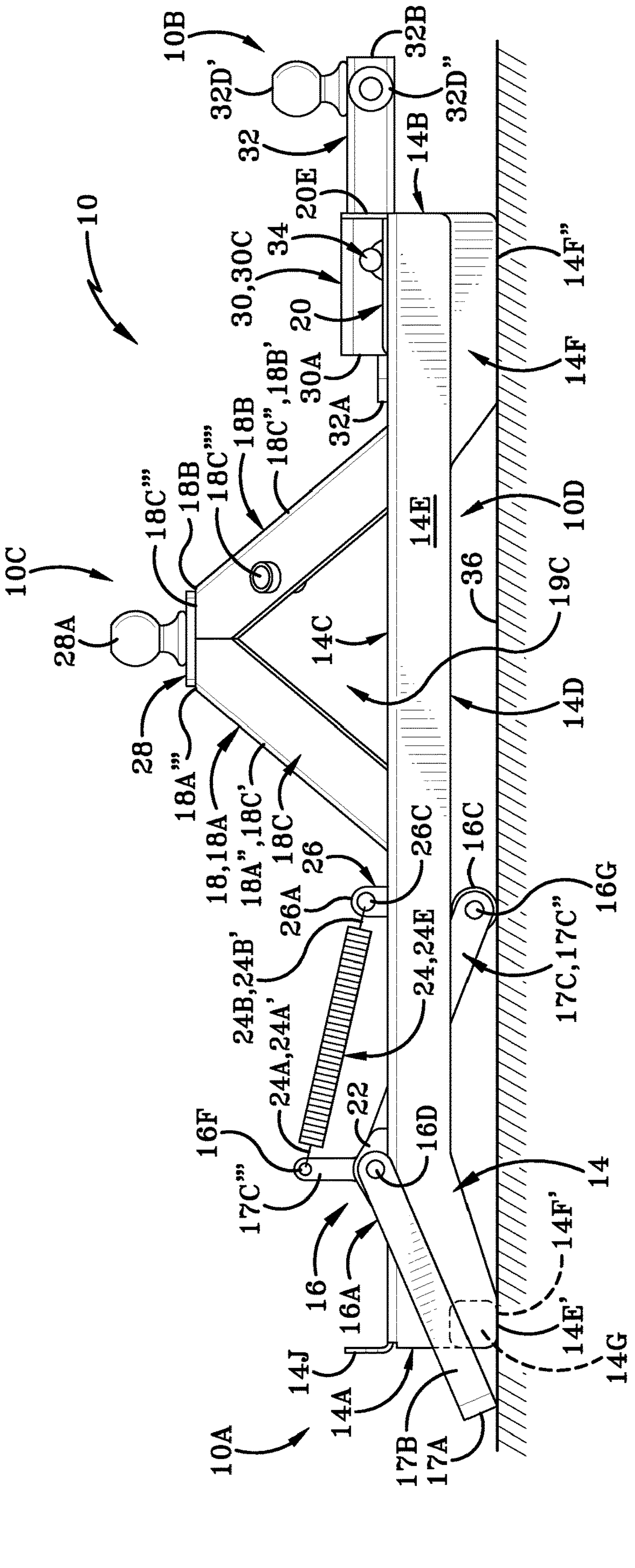
FIG. 5 is a right side elevation view of the moving apparatus looking in the direction of the line 5-5 of FIG. 3, and showing the moving apparatus in contact with a support surface such as the ground.

Outer wall 14E and inner wall 14F of each channel member 14 extend between top wall 14C and bottom wall 14D. Each of the outer wall 14E and inner wall 14F is substantially planar along its length. The overall shape of the outer wall 14E and inner wall 14F differs when that particular wall is viewed from the side. Each outer wall 14E is straight along its uppermost edge where outer wall 14E intersects top wall 14C. The bottom edge of the outer wall 14E, however, is not straight from proximate the front end 14A of channel member 14 to proximate the back end 14B thereof. Instead, as shown in FIGS. 1 and 5, outer wall 14E includes a first region of a greater height proximate front end 14A of channel member 14. The height of the various regions of outer wall 14E and inner wall 14F is measured from top wall 14C downwardly to a bottom edge of the outer wall or inner wall proximate bottom wall 14D. The rest of outer wall 14E extending rearwardly from the first region is of a substantially constant height which is less than the height of the first region. The first region includes an area which is generally triangular in shape and extends below a bottom edge of the rest of the outer wall 14E which is of constant height. The first region includes a bottom edge section 14E' which is flat and straight. The rest of the bottom edge of the first region tapers in height moving from the bottom edge section 14E' in a rearwardly direction and intersects the bottom edge of the rest of the outer wall 14E at an angle β. It should be noted that the T-shaped bottom wall 14D terminates a distance inwardly above the bottom edge of the outer wall 14E.

The inner wall 14F of each channel member 14 is differently configured from the outer wall 14E thereof. Inner wall 14F includes a first region which is substantially identical and laterally aligned with the first region of outer wall 14E. Inner wall 14F, however, also includes a second region which is originates in rear end 14B and extends forwardly towards front end 14A, terminating a short distance from rear end 14B. Inner wall 14F is of a substantially constant height between the first region and the second region. The first region, like the first region of outer wall 14E, includes a generally triangular portion which extends below the rest of the bottom edge of the constant height portion of inner wall 14F located between the first and second regions. The bottom edge of the generally triangular portion includes a ground-engaging straight, flat section 14F' which is laterally aligned with the ground-engaging straight, flat section 14E' of outer wall 14E. The rest of the bottom edge of the first region of the inner wall 14F tapers in height from the section 14F' to the bottom edge of the rest of the inner wall 14F. The tapering bottom edge of the first region of the inner wall is disposed at the same angle β as the tapering bottom edge of the first region of outer wall 14E.

Second region of inner wall 14F is generally rectangular in shape and is of substantially the same height as the bottom region. A section of the bottom edge of the second region tapers in height as it angles to join the bottom edge of the region of constant height which extends between the first and second regions of inner wall 14F. The angled section of the second region is located a distance forwardly from the rear end 14B of channel member 14. The bottom edge of the second region of inner wall 14F includes a straight, flat section 14F". When moving apparatus 10 is placed in contact with a surface 36, such as is illustrated in FIG. 5, the bottom edge sections 14E', 14F' and 14F" contact the surface 36 and elevate the rest of the body of moving apparatus 10 off of the surface 36.

Figure 7:
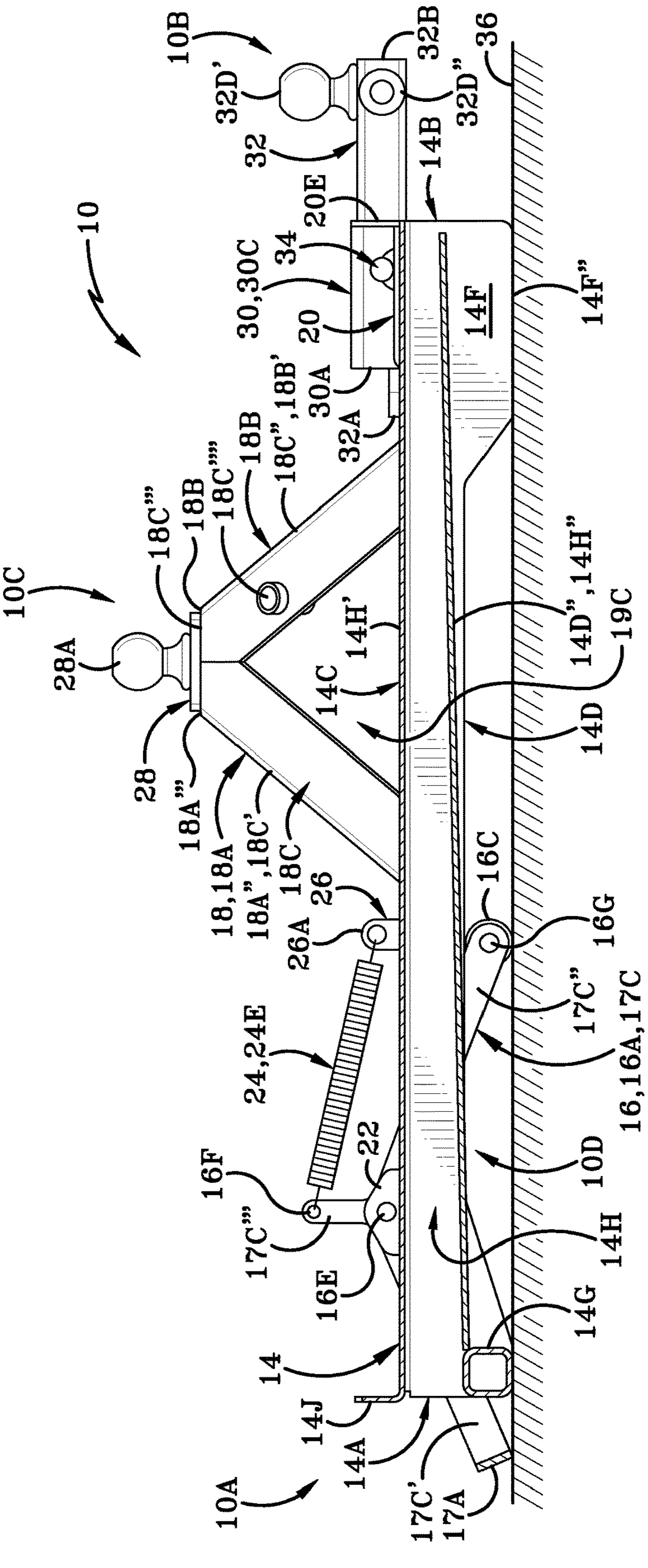
FIG. 7 is a cross-sectional view of the moving apparatus taken along line 7-7 of FIG. 3 and showing the moving apparatus in contact with the support surface such as the ground.

Referring to FIGS. 2, 4, and 7, an opening is defined in the front end 14A of each channel member 14. A horizontal member 14G just inside the opening and is shown in FIG. 4, that horizontal member 14G is located proximate a terminal end of the strip portion 14D" of the bottom wall 14D. The horizontal member 14G spans the distance between an interior surface of outer wall 14E and an interior surface of inner wall 14F. Top wall 14C, bottom wall 14D, outer wall 14E, and inner wall 14F bound and define a guided channel 14H which extends rearwardly into channel member 14 from the opening defined in front end 14A thereof. The horizontal member 14G is operative to aid in creating the entrance to the guided channel 14H within the body of the channel member 14. The opening to the guided channel 14H, the actual guided channel 14H and the gaps defined on either side of the strip portion 14D" of the bottom wall 14D are all in fluid communication with one another.

As best seen in FIG. 7, top wall 14C of channel member 14 forms a top wall 14H' that bounds the guided channel 14H and bottom wall 14D of channel member 14 forms a bottom wall 14H" that bounds the guided channel 14H. A distance between top wall 14H' and bottom wall 14H" of guided channel 14H tapers in height moving in a direction from the front end 14A of channel member 14 toward the rear end 14B thereof. This is accomplished by arranging the bottom wall 14C of guided member 14 (and thereby the bottom wall 14H" of guided channel 14H) to angle upwardly towards the interior surface of top wall 14D moving in the direction from front end 14A to rear end 14B of channel member 14. The slope on bottom wall 14C, and thereby bottom wall 14H", aids in guiding a tine 12A (FIG. 8A) of a forklift 12 into each guided channel 14H of the moving apparatus 10. The tine 12A is also caused to angle upwardly towards the interior surface of top wall 14D towards rear end 14B. Consequently, when moving assembly 10 is lifted off the support surface or ground 36, the first arm member 16A (or second arm member 16B) will keep the associated tine 12A locked in place to the respective channel member 14 of moving apparatus 10. This arrangement also helps to ensure that as the forklift 12 remains tightly engaged with the moving apparatus 10 even if the forklift 12 is traveling over a surface which is not completely level. The tapering guided channel 14H and abutting contact of the tine 12A with the interior surface of the top wall 14C also holds the tine 12A in close proximity to the top wall 14C and minimizes movement of the tine 12A within guided channel 14H. It will be understood that in other exemplary alternative embodiments, the bottom wall 14H" which defines guided channel 14H may not be sloped but may instead be positioned a constant distance from the top wall 14H' along the length of channel member 14.

Referring to FIGS. 1 and 5, a retaining ledge 14*j* (also referred to herein as a "stop") extends upwardly from the top wall 14C of each channel member 14, proximate the front end 14A thereof. The retaining ledge 14J is generally upright in nature, being oriented generally at a right angle to an exterior surface of top wall 14C, as best seen in FIG. 5. In the embodiment shown in the attached figures, the retaining ledge 14J integrally formed with the top wall 14C and therefore fabricated from the same material. Other embodiments provide for the retaining ledge 14J to be formed as a separate component from top wall 14C and to be later attached to top wall 14C via a suitable attachment mechanism such as welding or fasteners. The retaining ledge 14J defines a notch 14J' on a side of the ledge proximate inner wall 14F of the associated channel member 14. Retaining ledge 14J and particularly the notch 14J' defined therein, are operative to engage the associated first arm member 16A or second arm member 16B of retaining assembly 16 and thereby prevent the retaining assembly 16 from over-rotating. This will be discussed later herein with respect to the operation of the moving apparatus 10.

Referring now to FIGS. 1-7, the retaining assembly 16 is discussed hereafter in greater detail. As indicated earlier herein, retaining assembly 16 comprises two arm members 16A and 16B which are joined to one another via a crossbar 16C. Arm members 16A, 16B are identical to one another and are arranged as mirror images of one another about the imaginary midline "ML" (FIG. 4). Each arm member 16A, 16B is substantially U-shaped when viewed from above as in FIG. 3. Each arm member includes a base 17A, a first leg 17B extending outwardly in a first direction from a first end of base 17A, and a second leg 17C extending outwardly in the first direction from a second end of base 17A. Base 17A is of a length which is slightly longer than the width of the associated channel member 14 with which the particular arm member 16A or 16B is engaged (as will be later described herein). First leg 17B and second leg 17C are substantially parallel to one another and are laterally spaced a distance apart from one another. First leg 17B is arranged to extend alongside a portion of outer wall 14E of the associated channel member 14 and second leg 17B is arranged to extend alongside a portion of the inner wall 14F of the associated channel member 14. First leg 17B is pivotally engaged to the associated channel member 14 via a first pivot pin 16D and second leg 17C is pivotally engaged to the associated channel member 14 via a second pivot pin 16E, as will be described hereafter.

First leg 17B is a planar member that is straight and in the same plane along its entire length, where the length is measured from base 17A to a free end of first leg 17B. The free end of the first leg 17B is pivotally engaged with the channel member 14 by first pivot pin 16D extending through an aperture (not numbered) defined in the free end of the first leg 17B and through an aligned aperture (not numbered) defined in a flange 22 welded to channel member 14. In the illustrated embodiment, each flange 22 extends upwardly from the top wall 14C of channel member 14 proximate outer wall 14E but it will be understood that the two flanges 22 may instead be welded to inner wall 14F and outer wall 14F. Flanges 22 are laterally aligned with one another and are located a relatively short distance rearwardly of front end 14A of channel member 14.

Second leg 17C is differently configured to first leg 17B. Instead of being straight along its entire length from base 17A to a free end thereof, second leg 17C is substantially of an inverted V-shaped. Second leg 17C comprises a first section 17C' and a second section 17C" which intersect at an apex. First section 17C' originates in the second end of base 17A and is of substantially the same length as the first leg 17B. Second section 17C" extends from the apex (and thereby from first section 17C") to a free end remote from the apex. The lower edges of the first and second sections 17C', 17C" are oriented at an angle Θ (FIG. 2) relative to one another. The angle Θ is an obtuse angle and preferably is 120°. (In other embodiments, the angle Θ may be between 90° and 120°, or may be greater than 120° but less than 180°). An aperture (not numbered) is defined in the apex of the second leg 17C and the second pivot pin 16E extends through the aperture and through an aligned aperture (not numbered) defined in a second flange 22 provided on the channel member 14. The second flange 22 is laterally aligned with the first flange 22 and extends upwardly and outwardly from the top wall 14C of the channel member but is located proximate the inner wall 14F thereof. First leg 17B and first section 17C' of second leg 17C are of a length that is greater than the distance between the flanges 22 and the front end 14A of channel member 14. As a result, the base 17A of each arm member 16A or 16B is located a distance outwardly beyond the front end 14A of the associated channel member 14.

Referring still to FIG. 2, a third section 17C'" of second leg 17C extends outwardly away from the apex of the second leg 17C. The third section 17C'" may be arranged at an angle of about 120° relative to an upper edge of each of the first section 17C' and the second section 17C". An aperture 16F is defined in the third section 17C'" and the purpose of aperture 16F will be described later herein.

Figure 6:
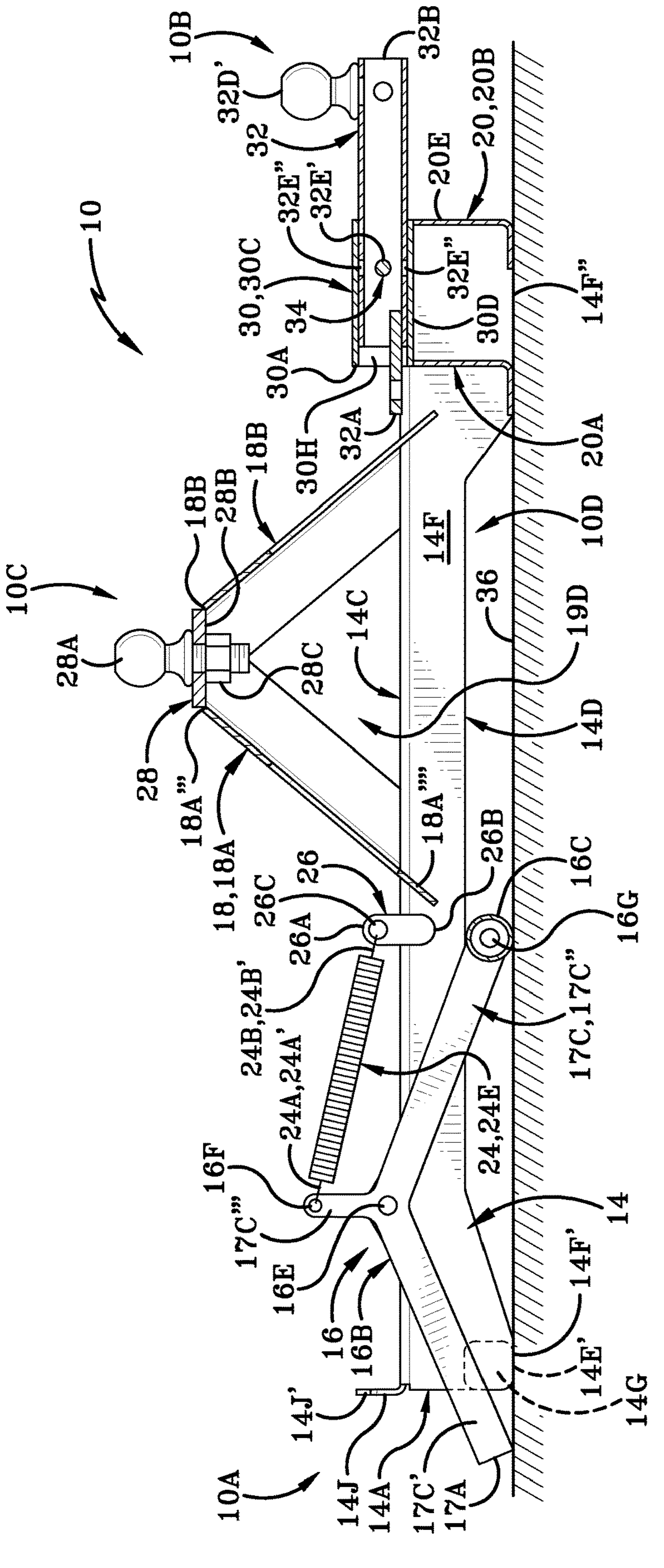
FIG. 6 is a cross-sectional view of the moving apparatus taken along line 6-6 of FIG. 3 and showing the moving apparatus in contact with the support surface such as the ground.

The second section 17C" of the second leg 17C of arm member 16A and of arm member 16B are engaged with opposite ends of the crossbar 16C via fasteners 16G (FIG. 6). When retaining assembly 16 is actuated, as will be later described herein, the arm members 16A, 16B, and crossbar 16C will move in unison with one another.

A biasing member 24 operatively engages the retaining assembly 16 to one or both channel members 14. In the illustrated embodiment, the biasing member 24 comprises a spring which is engaged with each channel member 14 and a part of the retaining assembly 16. Each spring extends between the retaining assembly 16 and a stanchion 26 welded to the inner wall 14F of an associated channel member 14. The stanchion 26 is located a distance rearwardly of the flange 22 and includes a body with a first end 26A that is welded to the inner wall 14F of channel members 14. The body of stanchion 26 includes a second end 26B remote from the first end 26A. An aperture 26C is defined in the second end 26B. The aperture 16F on third section 17C''' of second leg 17C of each arm member 16A, 16B is operative to accept a hook 24A' provided on a first end 24A of the spring 24. The spring 24 further has a body which further includes a second end 24B that is longitudinally opposed to the first end 24A. The second end further includes a second hook 24B' which extends through the aperture 26C defined in the stanchion 26.

While moving assembly 10 is in contact with the ground or other surface, such as is illustrated in FIGS. 2, 5, and 6, the spring 24 is operative to be in an extended position 24E. In this extended position 24E the guided channel 14H of the channel member 14 remains accessible, i.e., the opening to the guided channel 14 defined in front end 14A of channel member 14 is not blocked by base 17A of the associated arm member 16A or 16B of retaining assembly 16. When moving assembly 10 is in contact with the ground the crossbar 16C is in contact with the ground and this contact prevents the crossbar 16C from moving. Because the crossbar 16C is maintained in the same position by the ground or other surface, the crossbar 16C in turn keeps arm members 16A, 16B from pivoting about a pivot axis extending along the aligned pivot pins 16D, 16E. The end result of contact with the ground or other surface is that the base 17A of each arm member 16A, 16B rests on the ground or other surface and is substantially aligned with the horizontal member 14G of the associated channel member 14, and therefore does not obstruct the guided channel 14H of channel member 14.

Figure 8A:
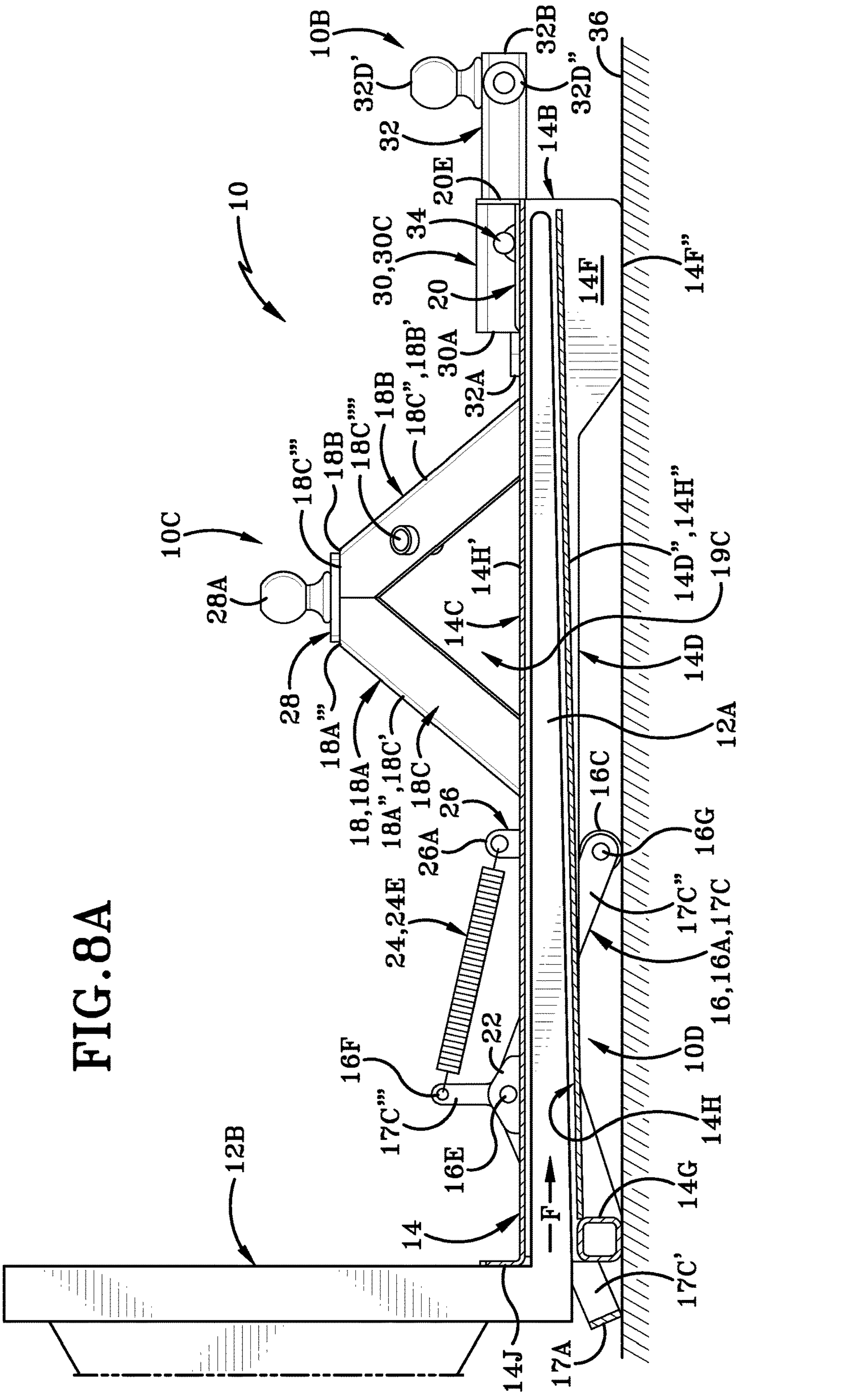
FIG. 8A is a cross-sectional view of the moving apparatus similar to FIG. 7 shown resting on the support surface or the ground, with the retaining assembly in an open position and showing a tine of a forklift being inserted into the channel member of the moving apparatus.
Figure 8B:
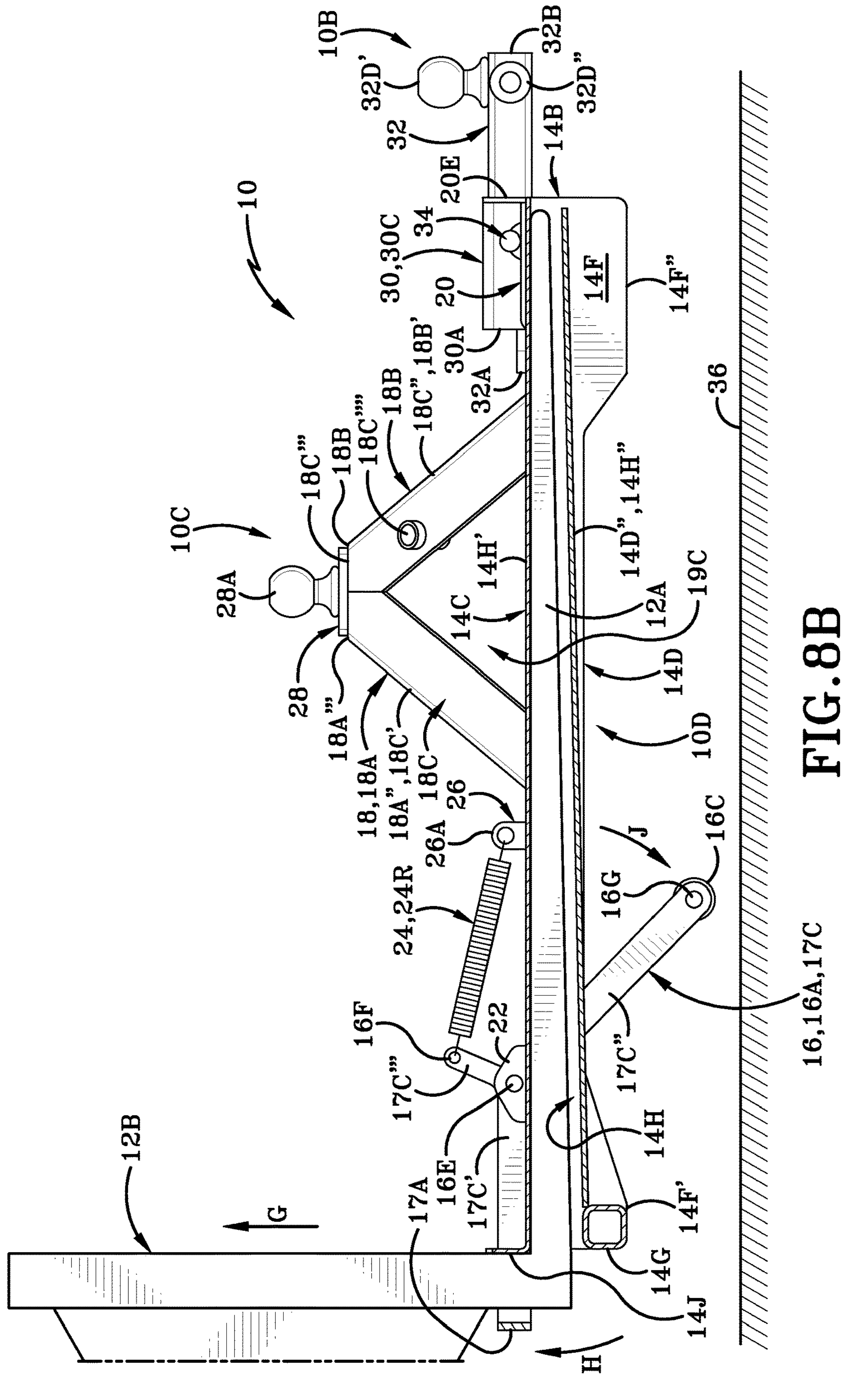
FIG. 8B is a cross-sectional view of the moving apparatus similar to FIG. 7 showing the tine of the forklift fully engaged in the channel member of the moving apparatus, and showing the forklift lifting the moving apparatus off of the support surface or the ground, and further showing the retaining assembly moved to a closed position.

If moving assembly 10 is lifted off of the ground or the other surface, spring 24 moves from the extended position 24E to the retracted position 24R (FIG. 8B). As the spring 24 is retracted into the retracted position 24R, the arm members 16A, 16B pivot about the pivot axis extending along the aligned pivot pins 16D, 16E because the crossbar 16C is no longer being restrained from moving by the ground or other surface. The retracting motion of spring 24 causes arm members 16A, 16B to pivot about the pivot axis extending along pivot pins 16D, 16E. This pivotal motion moves the base 17A upwardly past the horizontal member 14G and the opening to the guided channel 14H. The pivotal motion of arm members 16A, 16B stops when second arms 17C enter the notches 14J' defined by retaining ledges 14J. As can be seen from FIG. 8B, when the pivotal motion of arm members 16A, 16B is halted by retaining ledges 14J, base 17A of each arm member 16A, 16B is located above the top wall 14C of the associated channel member 14.

Sections 17C', 17C'', and 17C''' of second leg 17C are arranged at an angle of approximately 120 degrees to one another. In alternative embodiments the angle between adjacent sections of second leg 17C may be other than 120° depending on the stiffness of the springs 24 used to bias the retaining assembly 16 into a closed position. In the closed position, the base 17A of the two arm members 16A, 16B is located a distance vertically above the plane of the exterior surface of top wall 14C of the associated channel member 14. The retaining assembly 16 is movable to an open position. In the open position, base 17A of each arm member 16A, 16B is positioned so that the opening to guided channel 14H in front end 14A of the associated channel member 14 is accessible. The retaining assembly 16 is moved from the closed position to the open position by lowering the moving apparatus 10 towards the ground until the crossbar 16C contacts the surface. When this occurs, the crossbar 16C causes the arm members 16A, 16B to pivot in a one direction about the pivot access and expand the springs 24. The retaining assembly 16 is moved from the open position by raising the moving apparatus off the ground 46 until the crossbar 16C breaks contact with the surface. When this occurs, the springs 24 automatically return to their retracted positions and pivot the arm members 16A, 16B in the opposite direction about the pivot axis. The pivotal motion raises the base 17A of each arm member 16A, 16B above the plane of the exterior surface of the top wall 17C of the associated channel member 14. The purpose of being able to move the retaining assembly between the open position and the closed position will be discussed later herein.

Referring now to FIGS. 1-7, pyramidal frame 18 will be described in greater detail. Pyramidal frame 18 is located between the front 10A and rear 10B of the moving apparatus 10. Pyramidal frame 18 spans the space between the two channel members 14 in a location between the front ends 14A and rear ends 14B thereof. Pyramidal frame 18 has a body that has four generally triangular faces, namely, a front face 18A, a rear face 18B, a first side face 18C, and a second side face 18D. Each of the front face 18A, rear face 18B, first side face 18C and second side face 18D are welded to the channel members 14. Front face 18A faces towards front ends 14A of channel members 14 and inclines upwardly and rearward towards rear ends 14B. Rear face 18B faces towards rear ends 14B of channel members 14 and inclines upwardly and forwardly towards front ends 14A. The inclined front face 18A and rear face 18B terminate in a top of the pyramidal frame 18. First side face 18C faces the outer wall 14E of a first one the two channel members and inclines upwardly and sideways towards the second one of the two channel members. Second side face 18D faces the outer wall 14E of the second one of the two channel members 14 and is inclined upwardly and sideways towards the first one of the two channel members 14. The first side face 18C and second side face 18D terminate in the top of the pyramidal frame. The front face 18A interfaces along a first end 18A' with a second end 18D'' of the second side face 18D and along a second end 18A'' with a first end 18C' of the first side face 18C. The rear face 18B interfaces along a first end 18B' with a second end 18C'' of the first side face 18C and along a second end 18B'' with a first end 18D' of the second side face 18D. Where the ends 18A', 18D''; 18A'', 18C', 18B', 18C'', 18B'', 18D' of the various faces 18A, 18B, 18C, and 18D intersect one another, they form corners on the structural members which comprise frame 18.

FIGS. 3 and 4 show that first face 18A defines a cut-out 19A, second face 18B defines a cut-out 19B, third face 18C defines a cut-out 19C, and fourth face 18D defines a cut-out 19D. The opening 18E and cut-outs 19A-19D help reduce the overall weight of the moving apparatus 10 while still ensuring the pyramidal frame 18 maintains structural integrity for the purpose for which the frame is provided (which will be discussed later herein). It will be understood that frame 18 may be constructed with any desired shape or size of cut-out 19A-19D in the one or more faces 18A-18*d*, or may omit one or more of these cut-outs. It will also be understood that the structural members which form frame 18 may all be integrally fabricated from one piece of sheet material which is die-cut and subsequently bent in order to form the final shape of frame 18. Alternatively, multiple sheets of material may be used to form the structural members which may then be welded or otherwise secured to one another to form frame 18.

An aperture 18C'''' is defined on one of the structural supports which forms third side face 18C. Aperture 18C'''' is provided to hold excess couplers or pins, as will be discussed later when describing future elements.

As best seen in FIG. 4, each side 18A, 18B, 18C, 18D has a flat edge 18A''', 18B''', 18C''' and 18D''' which bound and define an opening 18E. Because of the configuration of the various structural members which make up frame 18, frame 18 is effectively a truncated-pyramidal-shaped frame. A platform 28 is operatively welded to the first face 18A, second face 18B, third face 18C, and fourth face 18D in such a way to extend across the opening 18E. A hitch 28A is operatively engaged with platform 28. Platform 28 defines an aperture therein which extends from a top surface (not numbered but shown in FIG. 3) of the platform through to a bottom surface 28B (FIG. 4). Hitch 28A is secured to platform 28 by a retaining member 28C. Retaining member 28C is operative to hold hitch 28A in operative and static engagement with the platform 28. If desired, retaining member 28C may be disengaged, hitch 28A may be removed and replaced with a differently-configured hitch. Retaining member 28C may then be used to secure the differently-configured hitch to the platform 28.

As best seen in FIG. 5, when hitch 28A is engaged with platform 28, the hitch 28A extends vertically upwardly from the exterior surface of platform 28. Hitch 28A is illustrated as a ball hitch which is centrally located with respect to pyramidal frame 18 and is located a distance vertically above the top walls 14C of the channel members 14. In the exemplary embodiment, a standard rise hitch is shown. In alternative embodiments, a high rise hitch could be used instead. The general height of the hitch 28A is operative to allow for engagement of gooseneck hitches on articles to be moved by moving apparatus 10, as will be discussed later with respect to operation of moving apparatus 10.

Furthermore, the ball of hitch 28A may be of any one of a variety of different diameters, based on the type and weight of articles to be moved with moving apparatus 10. Additionally, although not shown herein, it will be understood that a king pin of an article such as a semi-trailer, may be inserted through the aperture defined in platform 28 and be secured in place. Alternatively, a structure which makes it possible for a king pin to be engaged with platform 28 may be operatively engaged with platform 28.

Referring to FIGS. 1-7, hitch frame 20 will now be described in greater detail. Hitch frame 20 has a body which is located between the inner walls 14F of the two channel members 14 and is secured therebetween in any suitable fashion. In one embodiment, the body of hitch frame 20 is welded to inner walls 14F in a location which generally aligns with the second regions of the inner walls 14F. The body of hitch frame 20 may be formed from a sheet of metal material which is bent to create a components which has a front end 20A which faces towards the pyramidal frame 18, and an opposed rear end 20B which faces away from the pyramidal frame 18. The body of hitch frame 20 further includes a first side 20C located proximate the inner wall 14F of one of the channel members 14, and an opposed second side 20D which is laterally spaced from the first side 20C and is located proximate the inner wall 14F of the other of the channel members 14. The first and second sides 20C, 20D are welded to the second regions of the inner walls 14F of the channel members 14. The rear end 20B of the sheet of metal forms a bumper 20E (FIGS. 2 and 6) which is generally flush with the rear ends 14B of the two channel members 14.

As best seen in FIG. 6, the sheet metal which forms the body of hitch frame 20 includes a first flange 20F which extends forwardly from a bottom of front end 20A and is horizontally aligned with the bottom edges of the second regions of the inner walls 14F of the two channel members. FIG. 4 shows that the first flange 20F extends from one channel member 14 to the other. Similarly, FIG. 6 shows a second flange 20G which extends forward from a bottom of rear end 20B and is horizontally aligned with the bottom edges of the second regions of the inner walls 14F of channel members 14, and with the first flange 20G. FIG. 4 shows that second flange 20G extends between the two channel members 14. It will be understood that the first flange 20F and second flange 20G are welded to inner walls 14F. FIG. 6 further shows that a top wall 20H extends between the vertically-oriented front end 20A and rear end 20B of the body of hitch frame 20. Top wall 20H is arranged to be substantially flush with the top walls 14C of the two channel members 14. Top wall 20H is welded at either end to inner walls 14F of channel members.

Although not numbered in the drawings, as shown in FIG. 2, top wall 20H defines a channel and connected U-shaped cut-out therein. The channel originates in front end 20A and the cut-out terminates in rear end 20B. The channel is aligned along the imaginary midline "ML" (FIG. 4) of the moving assembly 10. Rear end 20B of the body defines a recess that is aligned longitudinally with the channel in the top wall 20H. A hitch receiver 30 is provided as part of hitch frame 20. Hitch receiver 30 is received in the channel in the top wall 20H and extends longitudinally from the front end 20A of the body of hitch frame 20 and into the recess defined in the rear end 20B. As best seen in FIG. 2A a front end 30A of the hitch receiver 30 is flush with front end 20A of hitch frame 20 and a rear end 30B of hitch receiver 30 is flush with rear end 20B of hitch frame 20. Hitch receiver 30 is generally square in cross-section and includes a top wall 30C, a bottom wall 30D, a first side wall 30E, and a second side wall 30F which extend from front end 30A to rear end 30B. Aligned apertures 30G are defined in the first side wall 30E and second side wall 30F for receipt of a hitch pin. Top wall 30C, bottom wall 30D, first side wall 30E, and second side wall 30F bound and define a bore 30H through hitch receiver 30.

A removable ball mount 32 is selectively engageable with hitch receiver 30. Referring to FIG. 2A, ball mount 32 has a generally tubular body of complementary shape and size to be received within the bore of hitch receiver 30. Although not numbered, it will be understood the tubular body include a top wall, a bottom wall, a first side wall, and a second side wall. The tubular body of ball mount 32 includes a front end 32A which comprises a projection which extends outwardly beyond the tubular body of the ball mount 32. The body of ball mount 32 further includes a rear end 32B spaced longitudinally from the front end 32A. An aperture 32C is defined in the projection which forms the front end 32A of ball mount 32. A plurality of different trailer balls 32D', 32D'', 32D''' are provided on the tubular body proximate rear end 32B, with a separate trailer ball being located on each surface of the ball mount 32. For example, trailer ball 32D' may be provided on the top wall, trailer ball 32D'' may be provided on the first side wall, and trailer ball 32D''' may be provided on the second side wall. The trailer balls 32D', 32D'', 32D''' may be made of various materials including but not limited to: chrome, stainless steel, zinc, heat treated stainless steel, or nickel. Each of the trailer balls 32D', 32D'', 32D''' is fabricated in a different diameter, particularly those diameters typically used with different types and sizes of ball hitches. The diameter of the balls 32D', 32D'', 32D''' may therefore be 1⅞", 2", and 2$\frac{5}{16}$", but it will be understood that any suitable diameter of trailer ball may be provided on ball mount 32, as desired. The aperture 32C defined in the first end 32A of ball mount 32 is operative to be outfitted with a separate hitch different from the trailer balls 32D', 32D", 32D"' to further allow for a variety of hitches to be used within the apparatus 10. The separate different hitch may be a different diameter trailer ball or any other type of hitch mechanism. It will be additionally understood that a trailer ball may be provided on each of the four surfaces of the tubular region of the ball mount 32.

Referring specifically to FIG. 2A, the ball mount 32 is shown separated from the hitch receiver 30 as shown. In this view a pin 34 has been removed from the through hole 30G of the hitch receiver 30 and from a first through hole 32E' in the ball mount 32. The first through hole 32E' runs in a lateral manner, while a second through hole 32E" runs in a longitudinal direction as shown in this figure. The pin 34 has a body that is generally cylindrical in nature with a first end 34A and a second end 34B laterally opposed thereto. At the first end 34A there is a bulbous head portion 34C with an engageable handle 32D. At the second end 34B of the pin 34 there is a tapered portion 34E. Proximate the tapered portion 34E is a bearing 34F. The bearing 34F is operative to restrict movement of the pin 34 while inserted and no force is applied to the pin about its engageable handle 34D. The pin 34 is inserted into the through hole 30G of the hitch receiver 30 at the first side 30E and enter into the through hole 32E' or 32E" of the ball mount 32 before the other side of the hitch receiver 30F at its aperture 30G. The bearing 34F of the pin 34 is then operative to retain the ball mount 32 within the hitch receiver 30. The pin 34 is removed in the opposite direction in which it was placed. This insertion or removal of the pin 34 is indicated by arrow "A". Pin 34 is illustrated as a push pin but it will be understood that in other embodiments any suitable connector pin may be utilized instead of the illustrated pin 34.

When the pin 34 is removed, the ball mount 32 is no longer in operative connection with the hitch receiver 30 and ball mount 32 may be removed from hitch receiver 30 as indicated by arrow "B". Once removed from hitch receiver 30, ball mount 32 may be rotated clockwise or counterclockwise about a horizontal (or longitudinal) axis as indicated by arrow "C". Ball mount 32 may be rotated in order to position a selected one of the trailer balls 32D', 32D" and 32D"' for use. When the selected trailer ball is facing upwardly, such as trailer ball 32D' in FIG. 2A, then ball mount 32 is reinserted into the bore 30H of hitch receiver 30 and pin 34 is reengaged to lock ball mount 32 and hitch receiver 30 to one another. The particular set of aligned apertures 32E' or 32E" selected for insertion of pin 34 is dependent upon which of the trailer balls 32D', 32D", and 32D"' has been selected for use.

In other instances, it may be desired to engage a trailer ball of a different configuration from any of the trailer balls 32D', 32D", 32D"' with ball mount 32. This is accomplished by removing the ball mount 32 from hitch receiver 30 as described above and then rotating the ball mount 32 about a vertical axis as indicated by arrow "D". Ball mount 32 is then inserted into bore 30H of hitch receiver 30 from a direction moving from frame 18 towards frame 20. The differently configured trailer ball is then positioned in alignment with aperture 32C and a fastener is used to lock the differently configured trailer ball to ball mount 32. The pin 34 is then used to secure ball mount 32 to hitch receiver 30 as described earlier herein.

Having thus described an exemplary non-limiting configuration of the moving apparatus 10, the operation of the moving apparatus 10 will be discussed with reference to FIGS. 8A through 10B and focus on some exemplary features of the apparatus.

FIG. 8A shows a portion of the carriage 12B of a forklift being engaged with moving apparatus 10. Only a single tine 12A of the forklift carriage 12B is illustrated as being engaged with one of the two channel members 14 of the moving apparatus 10. It will be understood that forklift carriage 12B includes a second tine that will simultaneously be introduced into the other of the two channel members 14 of the moving apparatus. Consequently, the following description of the engagement of the moving apparatus with the forklift carriage applies equally to the second tine and the other channel member.

In order for moving apparatus 10 to be engaged with forklift carriage 12*b*, moving apparatus 10 must rest on the ground 36 (or another support surface such as a factory floor). When moving apparatus 10 is on the ground 36, the bottom edges of the first and second regions of channel member 14 is in contact with the ground 36. Additionally, as can be seen from FIG. 6, first and second flanges 20F, 20G of hitch frame 20 are also in contact with the ground 36. It should be noted that when moving apparatus 10 is on the ground 36, retaining assembly 16 is in the open position with crossbar 16C thereof in contact with the ground 36 and springs 24 therefore in the extended condition, as indicated by reference number 24E. Base 17A of the arm member 16A, 16B of retaining assembly 16 is located generally in alignment with horizontal member 14G at front end 14A of channel member 14. As such, the opening to guided channel 14H defined in front end 14A of channel member 14 is not obstructed by base 17A, and is therefore available for tine 12A to be introduced into the same.

The operator of the forklift will drive the vehicle towards moving apparatus 10, approaching it with tine 12A of carriage 12B aligned with channel member 14 and positioned such that the tip of tine 12A will be able to enter the opening to guided channel 14H. The tapered configuration of guided channel 14H helps to ensure that a variety of differently-configured typical forklift tines are able to be received into guided channel 14H. In order to slide tine 12A into guided channel 14H it may be necessary for the forklift operator to raise or lower carriage 12B so that the tip of tine 12A is aligned with the entrance opening in front end 14A of channel member 14. FIG. 8A shows that tine 12A has been inserted through the opening and has been moved, in the direction indicated by arrow "F", through guided channel 14H towards rear end 14B of channel member 14. This movement in the direction "F" is accomplished by driving the forklift towards the moving apparatus 10 in the direction "F". FIG. 8A shows tine 12A fully inserted into guided channel 14H and with a vertical surface of carriage 12B in abutting contact with retaining ledge 14J on front end 14A of channel member 14. The tip of tine 12A is located generally between top wall 14H' and bottom wall 14H" of guided channel 14H.

While tine 12A is shown in FIG. 8A as fully received within guided channel 14H, it should be noted that moving apparatus 10 is not secured to tine 12A or to forklift carriage 12B. The retaining assembly 16 remains in the open position and therefore the tines 12A can easily be withdrawn from guided channel 14H by simply reversing the forklift 12 in a direction opposite to arrow "F".

FIG. 8B shows moving apparatus 10 fully engaged with and secured to tine 12A and thereby to forklift carriage 12B. In order to secure moving apparatus 10 to forklift carriage, the operator of the forklift will lift the moving apparatus of FIG. 8A upwardly off the ground 36, as indicated by arrow "G". This upward movement of moving apparatus 10 causes crossbar 16C of retaining assembly 16 to break contact with the ground 36. The restraining force applied to spring 24 by crossbar 16C is thereby removed and spring 24 is free to retract and return to its original length. As spring retracts to its original length 24R, the entire retaining assembly, including crossbar 16C and arm members 16A, 16B rotate, as indicated by arrows "H" and "J", about the pivot axis which extends along pivot pins 16D, 16E (FIG. 2). Rotation of arm member 16A (and 16B) will result in base 17A of retaining assembly rotating, as indicated by arrow "H", from a first position generally aligned with horizontal member 14G of channel member 14 (shown in FIG. 8A) to a second position shown in FIG. 8B. In the second position, base 17A is located behind a rear wall of a part of carriage assembly 12B behind tine 12A. Base 17A is furthermore located vertically above a plane extending along the upper surface of top wall 14C of channel member 14. The rotation of retaining assembly 16 about the pivot axis in the direction indicated by arrows "H" and "J" is arrested by retaining ledge 14J on front end 14A of each channel member 14.

Lifting moving apparatus 10 off surface 36 also causes the upper surface of tine 12A and the tip thereof to move into contact with an interior surface of top wall 14H' defining guided channel 14H. First leg 17B and second leg 17C of each arm member 16A, 16B extends along a portion of the associated tine 12A and the base 17A of each arm member 16A, 16B remains behind a back region of the associated tine 12A. This arrangement prevents withdrawal of each tine 12A from the associated guided channel 14H. Moving apparatus 10 is thus secured to forklift carriage 12B and will move in unison with forklift carriage 12B. The retaining assembly 16 is therefore operative to hold the tines 12A of forklift 12 (FIG. 1) in engagement with moving apparatus 10 when the apparatus 10 is no longer in contact with surface 36.

Since guided channel 14H is tapered, tine 12A has reduced play in a vertical direction between the top wall 14H' and bottom wall 14H" of guided channel 14H. If the forklift 12 travels over uneven ground and hits a bump or enters a shallow depression, the resulting shock will tend to result in minimal vertical movement of the tine 12A within guided channel 14H. The tapered shape of guided channel 14H therefore acts as a type of dampening mechanism to such vertical movements.

Figure 9A:
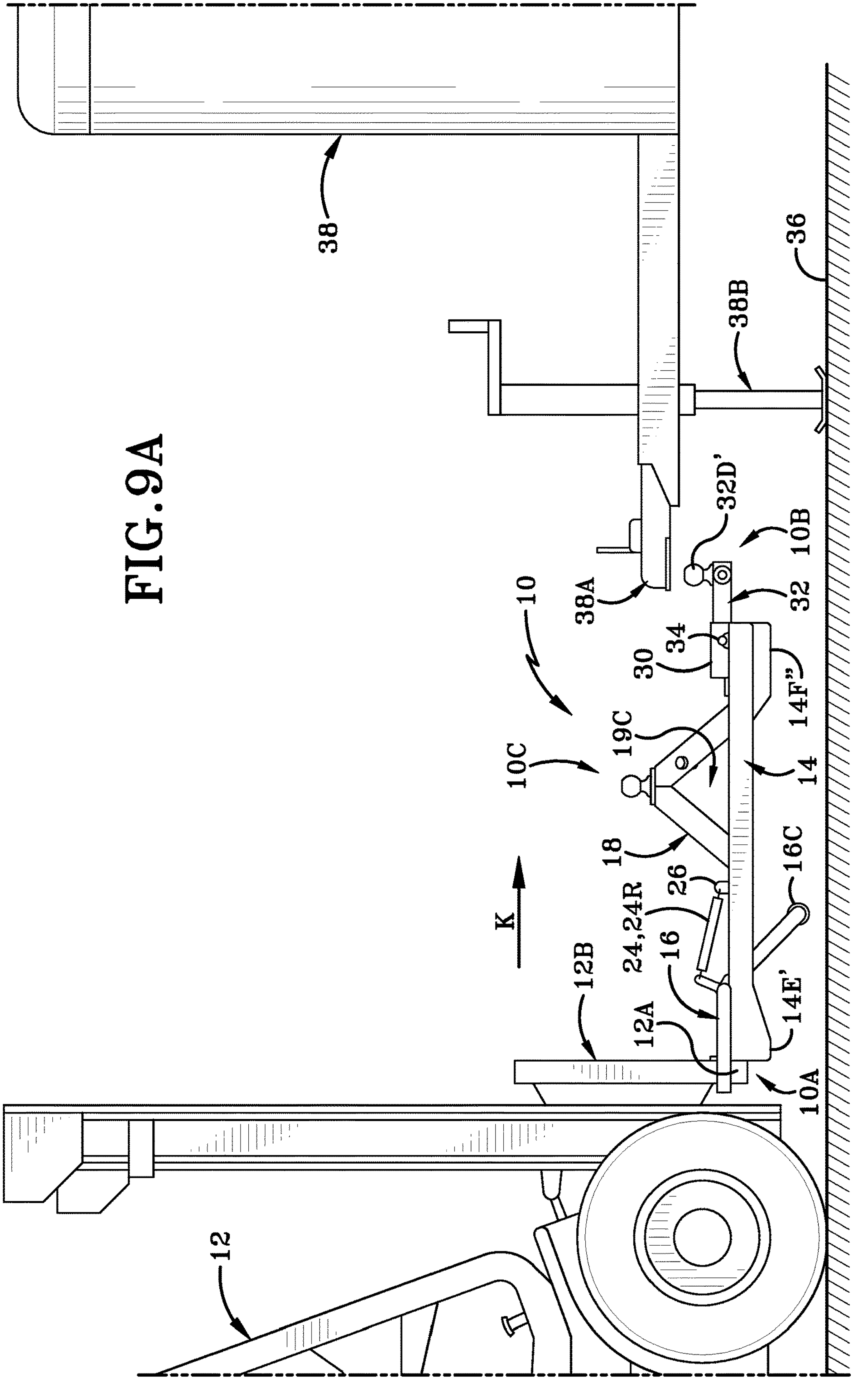
FIG. 9A is a right side elevation view of the moving apparatus engaged with the forklift and being moved towards a trailer having a ball hitch coupler.
Figure 9B:
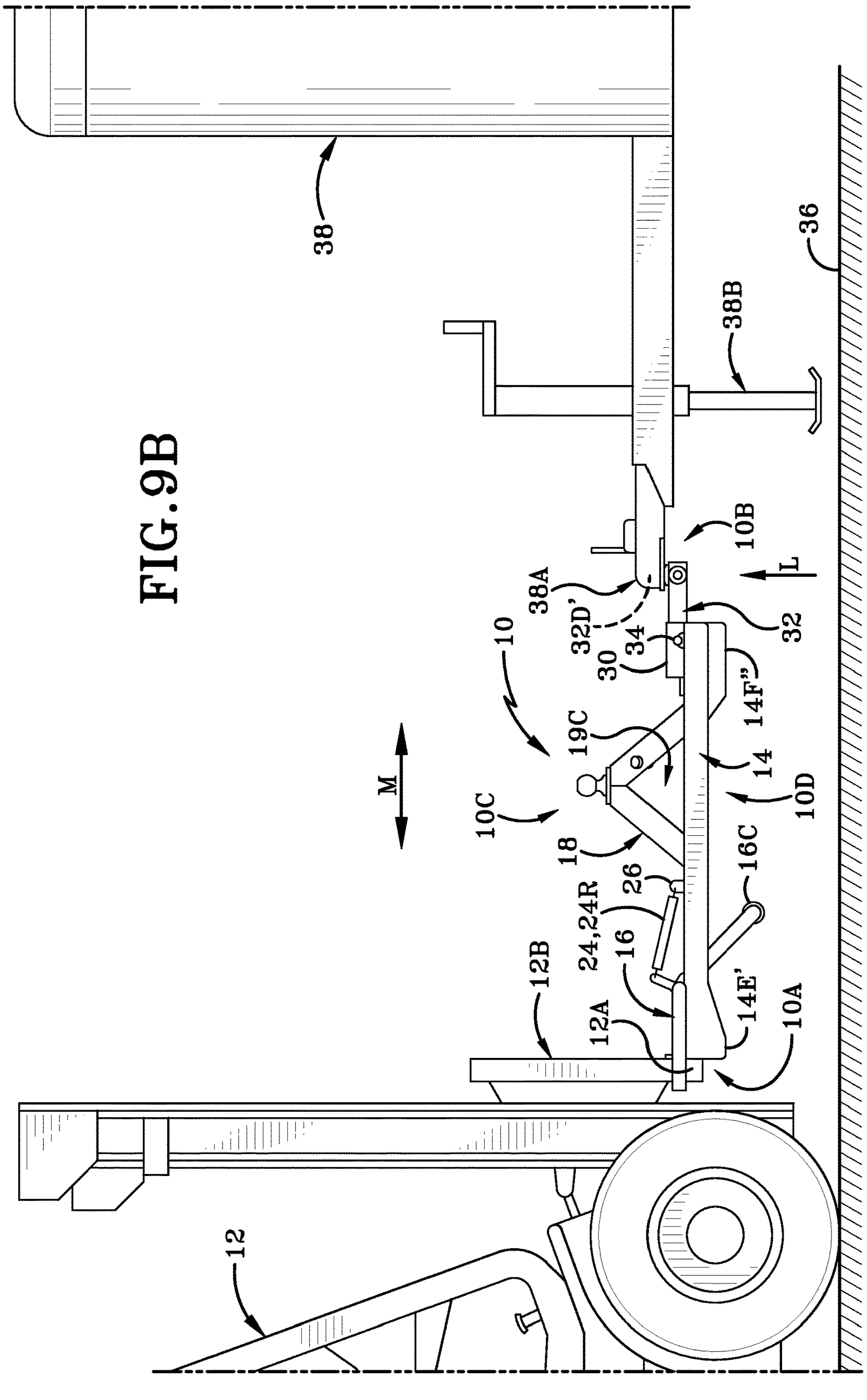
FIG. 9B is a right side elevation view of the moving apparatus being lifted by the forklift and being engaged with the trailer via the ball hitch coupler.

Moving apparatus 10 is useful as a mechanism for connecting articles to forklift carriage 12B. FIGS. 9A and 9B show moving apparatus 10 engaged with forklift 12, as described above, and moving in a direction indicated by arrow "K" towards a trailer 38. Trailer 38 is illustrated as including a coupler 38A and a trailer jack 38B. The trailer jack 38B retains the coupler 38A at a particular height off the surface 36 and can be manipulated to raise or lower the coupler 38A as needed. The forklift operator will note the particular type and size of the coupler 38A and will then select which of the trailer balls 32D', 32D", or 32D''' to use to engage with coupler 38A, as has been described earlier herein. FIG. 9A shows that the trailer ball 32D' has been selected by the operator and is extending upwardly from hitch frame 20. Moving apparatus 10 is shown at a height off the ground sufficient to keep apparatus 10 secured to forklift carriage 12B and furthermore at a height where trailer ball 32D' is lower coupler 38A. The operator will maneuver forklift 12 to generally align the trailer ball 32D' on the ball mount 32 with the coupler 38A without the operator leaving the forklift 12 or disengaging the trailer jack 38B.

Referring specifically to FIG. 9B, once trailer ball 32D' is vertically aligned with coupler 38A, the operator will raise the forklift carriage 12B, and thereby the moving apparatus 10 engaged therewith, lifting the moving apparatus further off the ground 36, as indicated by arrow L. The upward movement of moving apparatus 10 in the direction "L", causes trailer ball 32D' to engage coupler 38A of trailer 38. The operator will then exit the forklift, will rotate the arm (not numbered) of the coupler 38A to secure coupler 38A to trailer ball 32D'. Once coupler 38A and trailer ball 32D' are secured, the operator will rotate the handle of the trailer jack 38B, breaking contact between the trailer jack 38B and the ground 36. The trailer jack 38B may then be moved to a stowed position (not shown). At this point, forklift 12 is able to be used to move trailer 38 as desired because moving apparatus is secured to forklift 12 and is also secured to trailer 38. Trailer 38 is able to be freely physically manipulated and moved by forklift 12, as indicated by arrow "M" (FIG. 9B), across the ground 36. As such, coupling the trailer 38 to an agile vehicle such as forklift 12 is useful to quickly and efficiently move the trailer 38 from one location to another. Trailer 38 may be moved faster and more easily with forklift 12, via moving apparatus 10, than would be the case if the operator were using a truck or car, for example.

When trailer 38 has been moved to the new desired location, the operator will get out of the forklift 12, move the trailer jack 38B from the stowed position to the supportive position, lowering the foot of the trailer jack 38B back into contact with the ground 36. The operator will also unlock the locking mechanism which secures the coupler 38A to trailer ball 32D'. Once back in the forklift 12, the operator will manipulate the forklift carriage 12B and thereby the moving apparatus 10, lowering the moving apparatus 10 back towards the ground 36, in an opposite direction to arrow "L" (FIG. 9B). The lowering movement breaks the contact between moving apparatus 10 and trailer 38 and forklift 12 may then be reversed, in the direction opposite to arrow "K" (FIG. 9A) away from trailer 38 and may be then used to move other articles, such as other trailers.

Figure 10A:
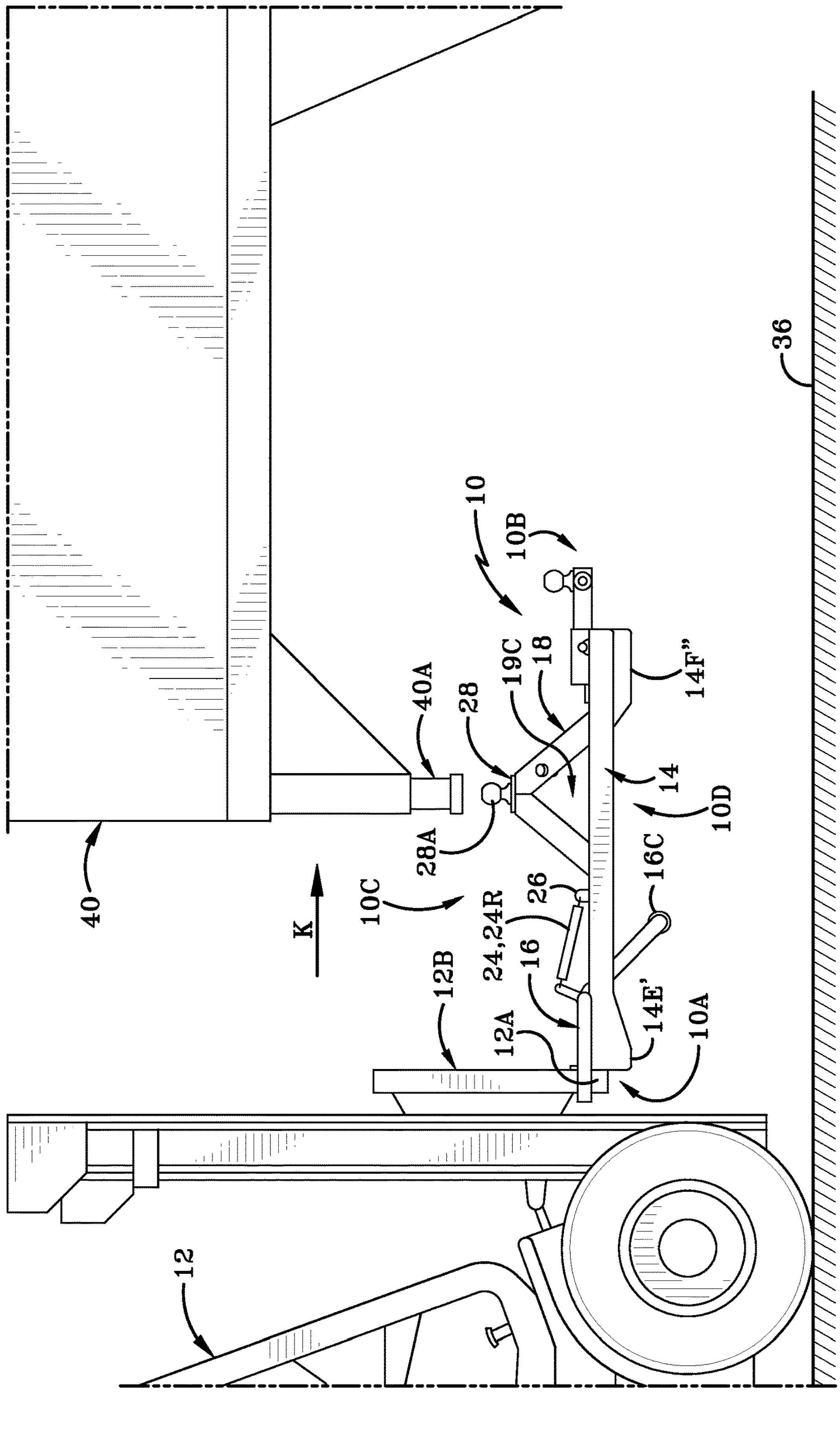
FIG. 10A is a right side elevation view of the moving apparatus engaged with the forklift and approaching a gooseneck style coupler.
Figure 10B:
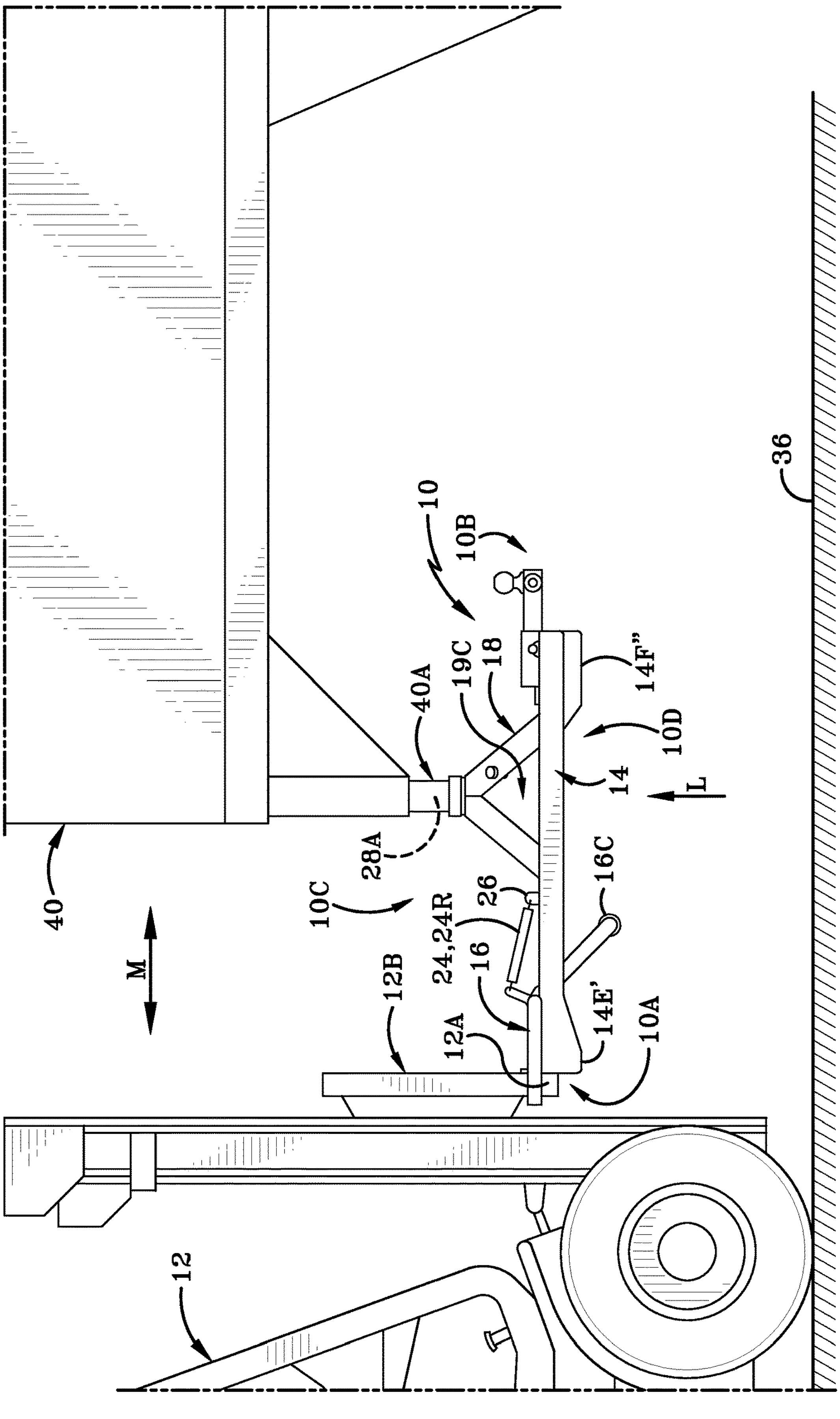
FIG. 10B is a right side elevation view of the moving apparatus being lifted by the forklift and being engaged with the gooseneck style coupler.

FIGS. 10A and 10B show moving apparatus 10 engaged with forklift 12 and being used to manipulate another article, such as another differently configured trailer 40. The second trailer 40 does not have a coupler such as coupler 38A but instead has a gooseneck-style hitch 40A. The operator of the forklift may decide to couple the moving apparatus 10 to second trailer 40 via the strong pyramidal frame 18 instead of the ball mount 32 when the overall weight or load of second trailer 40 may be too great for ball mount 32 or too great to be carried at one end of the moving apparatus 10. FIG. 10A illustrates that forklift is driven, in the direction indicated by arrow "K", towards the second trailer 40 until the pyramidal frame 18 is located beneath the hitch 40A. In particular, forklift 12 is used to manipulate moving apparatus 10 until the trailer ball 28A on pyramidal frame 18 is vertically aligned with a coupler on the hitch 40A. Initially, as shown in FIG. 10*a*, pyramidal frame 18 the trailer ball hitch 28A thereon is at a lower height than that of the gooseneck coupler 40A on second trailer 40.

FIG. 10B shows forklift carriage 12B being raised and thereby raising moving apparatus 10 relative to the ground 36 in the direction "L". Moving apparatus 10 is raised upwardly until hitch 28A on frame 18 engages the gooseneck style coupler 40A extending downwardly from second trailer 40. The operator is able to align and engage the hitch 28A on frame 18 with the gooseneck coupler 40A without leaving the forklift 12. Once hitch 28A and coupler 40A are secured to one another, forklift 12 may be used to physically manipulate and move second trailer 40 from one location to another via moving apparatus 10, as indicated by arrow "M". As such, an agile vehicle such as the forklift 12 is operative to quickly and efficiently move second trailer 40 through use of the moving apparatus 10 rather than using a truck or other such device with which the second trailer 40 would typically have to be coupled. Once second trailer 40 has been moved to the desired new location, trailer ball 28A is disengaged from its secure engagement with coupler 40A, forklift carriage 12B is lowered, thereby causing moving apparatus 10 to move closer to the ground, in the opposite direction to arrow "L", and then forklift 12 and moving apparatus can be utilized to move other articles, such as other trailers.

It should be noted that because of the raised height of the pyramidal frame 18 on moving apparatus 10, the trailer ball 28A on frame 18 may also be coupled to fifth wheel type couplers using an adapter (not shown) designed for connecting fifth wheel couplers to trailer balls.

Referring now to FIGS. 11-14, there is shown an alternative embodiment of moving apparatus in accordance with the present disclosure, generally indicated at 110. Moving apparatus 110 has a front end 110A, a rear end 110B, a top 110C, a bottom 110D, a first side 110E, and a second side 110F. Moving apparatus 110 comprises a pair of channel members 114, a retaining assembly 116 which is operatively engaged with the channel members 114, and a connector assembly 150 which is engaged with the channel members 114 and includes a connector assembly for securing an article to moving apparatus 110. The structure and function of these various components will be discussed hereafter. Although not illustrated in FIGS. 11-14 it should be understood that in another embodiment at least one cross-member may be provided on moving apparatus 110. The cross-member may extend between the two channel members 114 and be located between connector assembly 150 and the front end 110A of the body.

Figure 12:
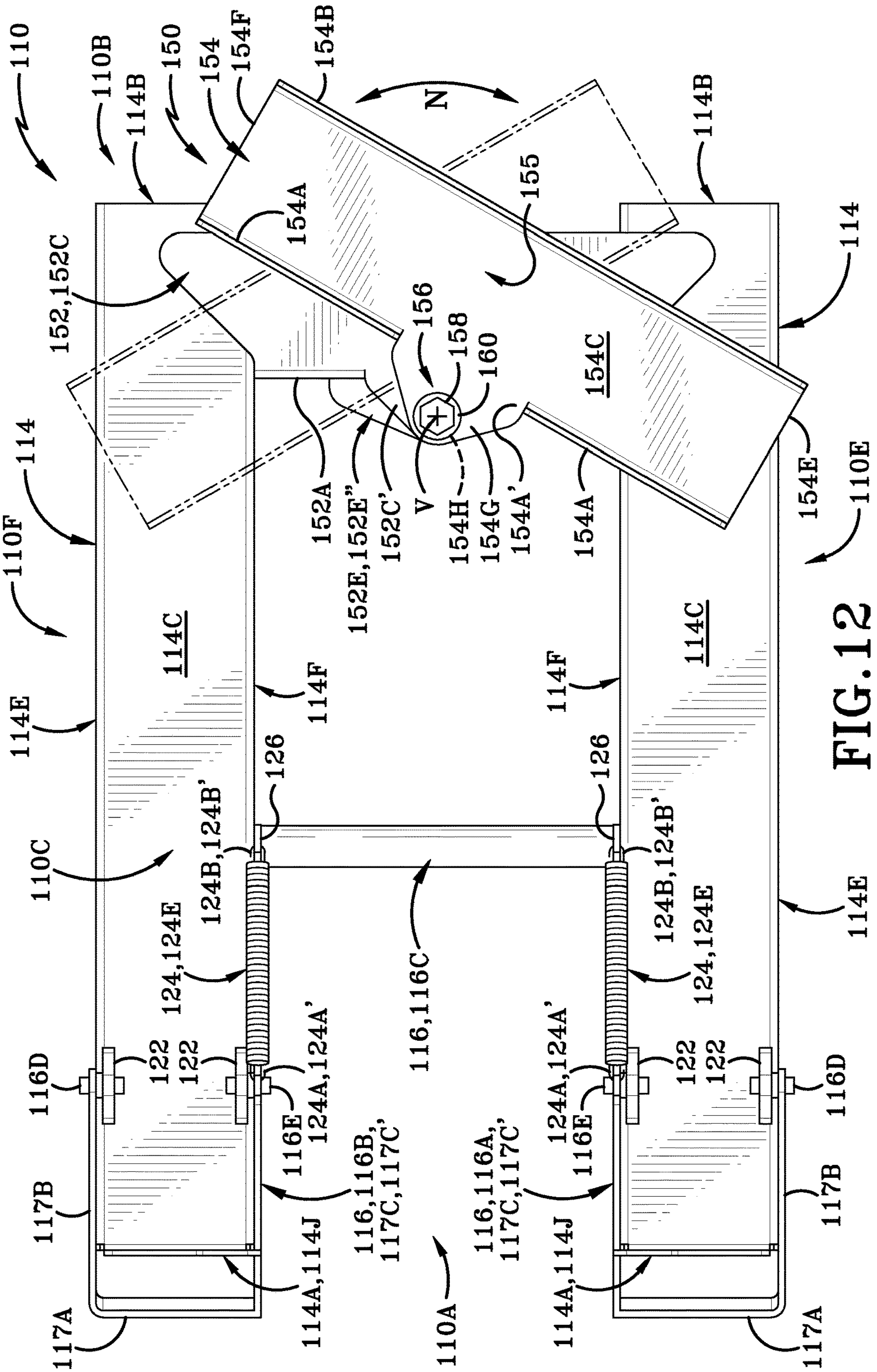
FIG. 12 is a top plan view of the moving apparatus of FIG. 11 illustrating the pivotal motion of a connector plate provided thereon.

Moving apparatus 110 includes a pair of channel members 114 which are substantially identical in structure and function to channel members 14. The two channel members 114 are substantially identical to one another and arranged as mirror images of one another about an imaginary midline "ML" (FIG. 12) of the body of moving apparatus 110. Each channel member 114, like channel members 14, has a front end 114A, a rear end 114B, a top wall 114C, a bottom wall 114D, an outer side 114E and an inner side 114F. The two channel members 114 are laterally aligned with one another. Each channel member 114 has a longitudinal axis which extends between front end 114A and rear end 114B thereof and is oriented at ninety degrees relative thereto. The longitudinal axis of one on of the channel member 114 is shown in FIG. 12 and indicated generally at "Y". The longitudinal axis "Y" is parallel to a longitudinal axis of the body which extends along midline "ML".

An opening (unnumbered) is defined in front end 114A of channel member 114 and a horizontal member 114G spans the width of the channel member 114 proximate bottom wall 114D. The top wall 114C, bottom wall 114D, outer side 114E and inner side bound and define a guided channel 114H which is accessible through the opening in front end 114A. A retaining ledge 114J extends upwardly from the top wall 114C of each channel member 114 proximate the front end 114A thereof. Front end 114A, rear end 114B, top wall 114C, bottom wall 114D, outer side 114E, inner side 114F, horizontal member 114G, guided channel 114H, and retaining ledge 114J are substantially identical in structure and function to front end 14A, rear end 14B, top wall 14C, bottom wall 14D, outer side 14E, inner side 14F, horizontal member 14G, guided channel 14H, and retaining ledge 114J, respectively, and therefore will not be described in any further detail herein.

Moving apparatus 110 also includes a retaining assembly 116 which is operable to secure moving apparatus 110 to a forklift or other type of lifting equipment that includes tines or forks. Retaining assembly 116 comprises two arm members 116A and 116B which are joined to one another via a crossbar 116C. Arm members 116A, 116B are identical to one another and are arranged on moving apparatus 110 as mirror images of one another about the imaginary midline "ML" (FIG. 12) of the moving apparatus body. Each arm member 116A, 116B is substantially U-shaped when viewed from above as in FIG. 12. Each arm member 116A, 116B includes a base 117A, a first leg 117B extending outwardly in a first direction from a first end of base 117A, and a second leg 117C extending outwardly in the first direction from a second end of base 117A. First leg 117B is pivotally engaged to the associated channel member 14 via a first pivot pin 116D and second leg 117C is pivotally engaged to the associated channel member 14 via a second pivot pin 116E. A biasing member in the form of a spring 124 is operatively engaged between each channel member 114 and retaining assembly 116. The arm members 116A, 116B and the crossbar 116C are identical in structure and function to the arm members 16A, 16B, and the crossbar 16C, respectively, and therefore will not be described in further detail herein. Channel members 114 include flanges 122 and stanchions 126 that are identical in structure and function to flanges 22 and stanchions 26 and therefore will not be further described herein. Similarly, spring 124 is substantially identical in structure and function to spring 24 and therefore will not be described in any further detail herein.

All of the components of moving apparatus 110 described to this point are substantially identical in structure and function to the same components of moving apparatus 10. Moving apparatus 110 differs from moving apparatus 10 in the structural components utilized as a connector assembly for securing an object, article, or piece of equipment to moving apparatus 110. Moving apparatus 10 includes two connector assemblies for securing articles thereto. Those two connector assemblies are the pyramidal frame 18 and the hitch frame 20. Moving apparatus 110 has a connector assembly, generally indicated at 150, which comprises a connector frame 152 and a platform 154 that is secured to the connector frame 152 via a pivot rod assembly 156. Each of the components of connector assembly 150 will be described in greater detail hereafter.

Connector frame 152 is located proximate rear ends 114B of channel members 114 and comprises a front wall 152A, a rear wall 152B (FIG. 13), a top wall 152C, and a bottom wall 152D. Front wall 152A, rear wall 152B, and bottom wall 152D span a gap 115 defined between the inner walls 114F of the two channel members 114. Top wall 152C is of a width that is greater than the width of the gap 115. As a consequence a first area of top wall 152C extends for a distance over the top wall 114C of a first one of the two channel members 114 and a second area of top wall 152C extends for a distance over the top wall 114C of a second one of the two channel members 114. Each of the front wall 152A, rear wall 152B, top wall 152C, and bottom wall 152D is welded to both channel members 114.

Figure 13:
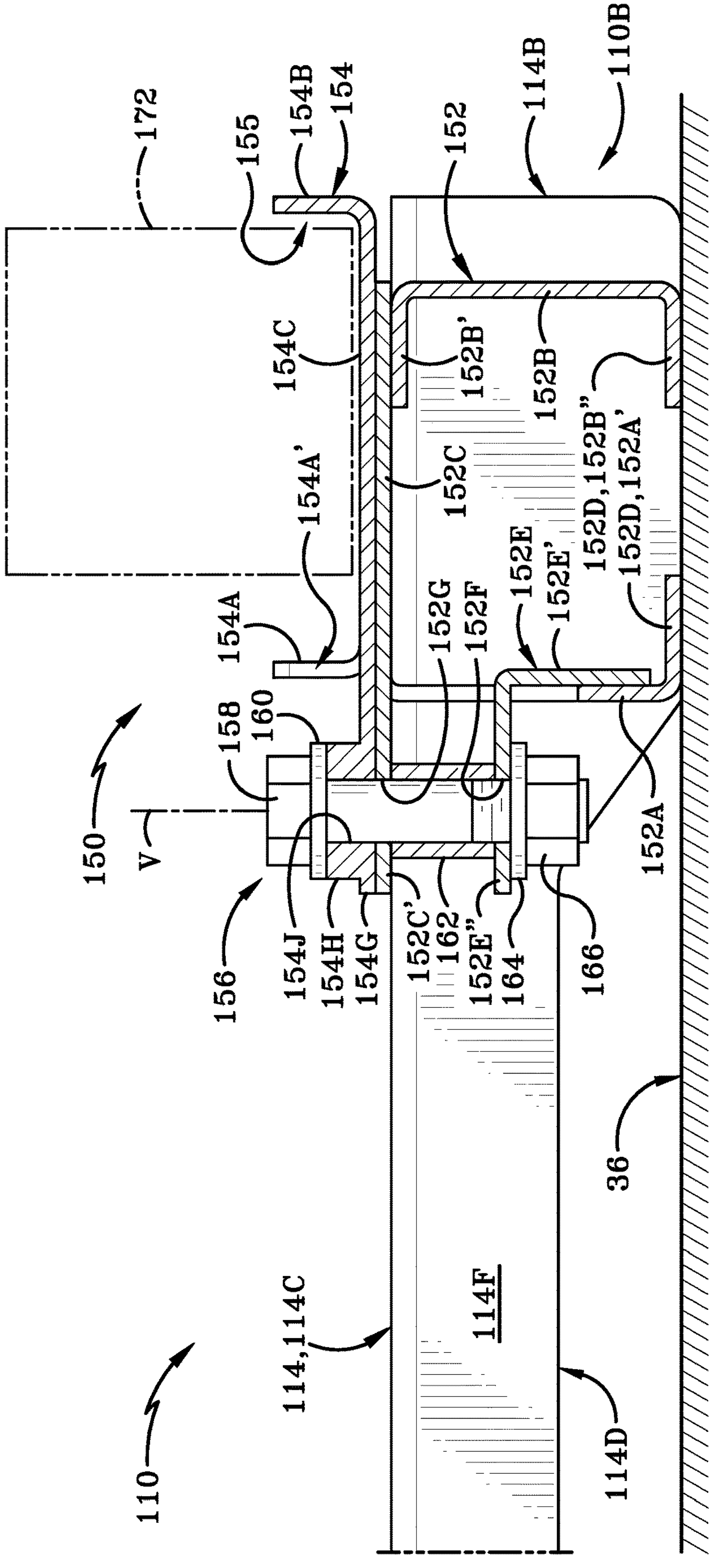
FIG. 13 is a longitudinal cross-section of the moving apparatus taken along line 13-13 of FIG. 11.

Bottom wall 152D is shown in FIG. 13 as being comprised of two flanges which extend horizontally towards one another from a lower end of front wall 152A and a lower end of rear wall 152B, respectively. These two flanges will be discussed further hereafter.

Front wall 152A of connector frame 152 is of a height which substantially approximates the height of the second regions of the inner walls 114F of channel members 114. Front wall includes a flange 152A' proximate its lower end. The flange 152A' is integral with the front wall 152A and is oriented at 90° relative thereto, extending rearwardly from a rear surface of front wall 152A moving in a direction towards rear ends 114B of channel members 114. Flange 152A' is aligned in a same plane as the bottom edge of the second regions of the inner walls 114F and will contact the ground 36 when moving apparatus 110 rests thereupon.

Figure 11:
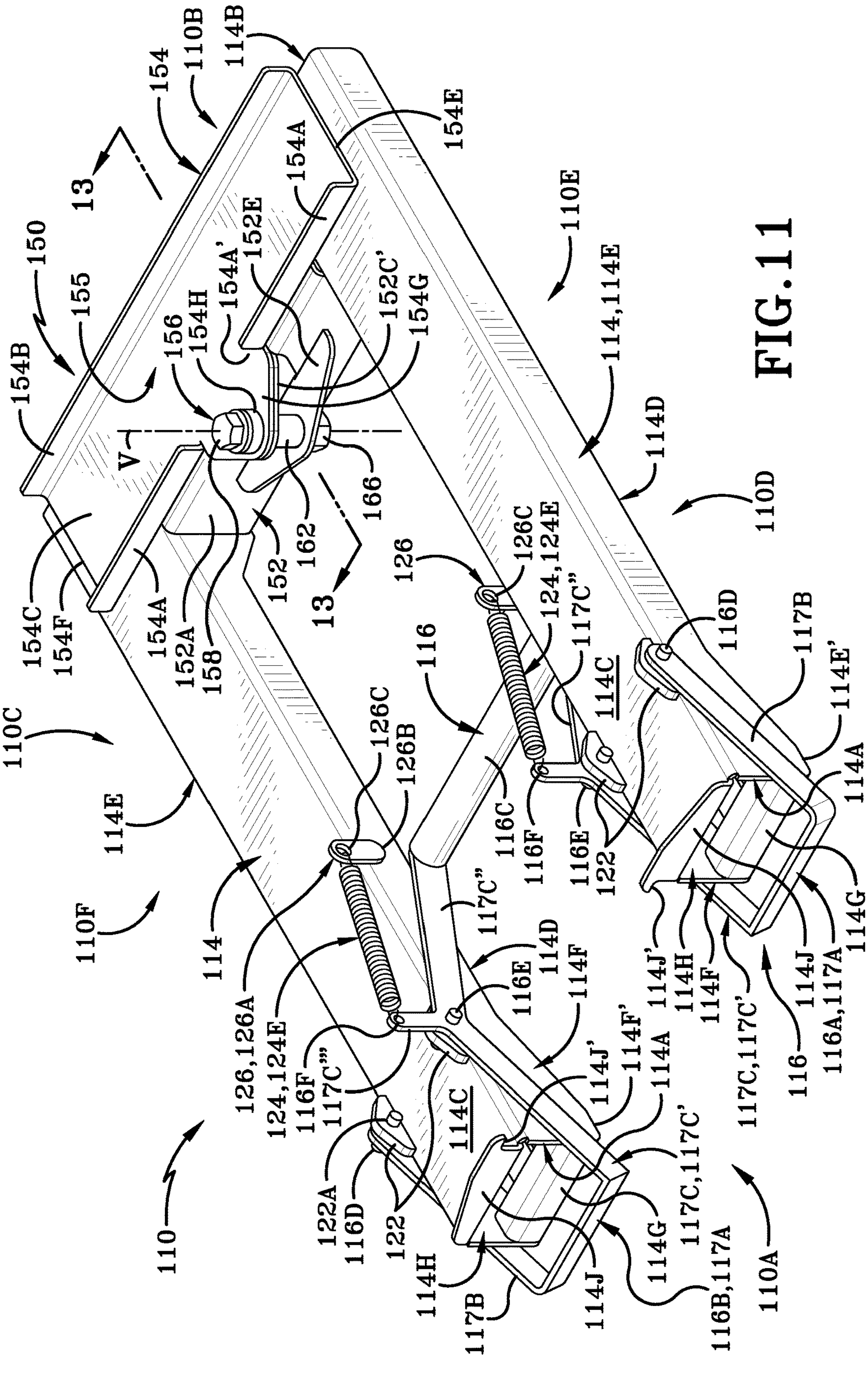
FIG. 11 is a front, top, right side isometric perspective view of a second embodiment of a moving apparatus in accordance with the present disclosure.
Figure 11A:
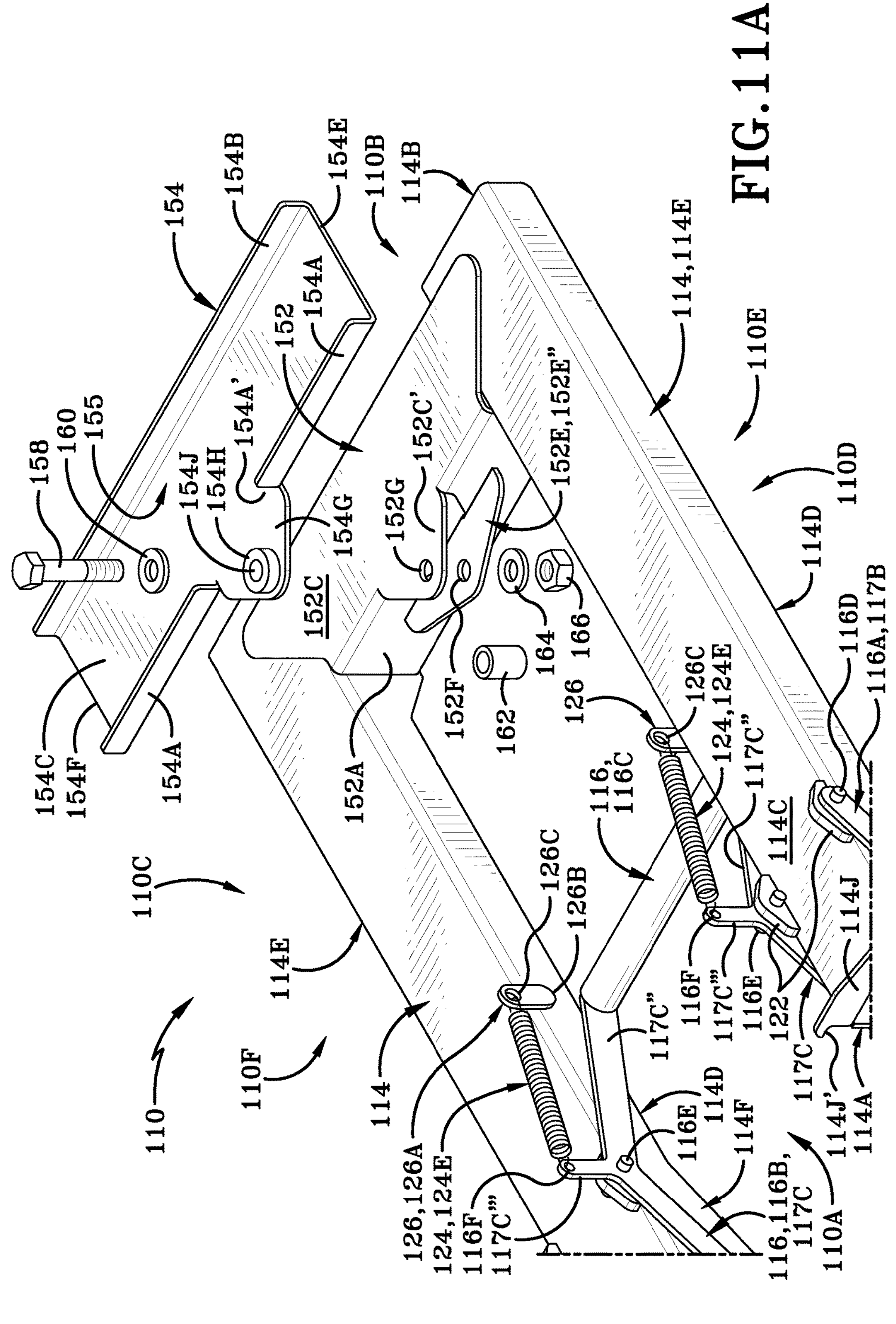
FIG. 11A is a partial exploded front, top, right side isometric perspective view of the moving apparatus shown in FIG. 11.

A cut-out 152A" is defined in front wall (FIGS. 11A and 13). The cut-out 152A" originates proximate top wall 152C and is located generally in a central region of the front wall 152A. Cut-out 152A" extends downwardly for a distance from proximate top wall 152C and terminates a distance vertically above flange 152A' as can be seen in FIG. 13. An L-shaped bracket 152E is engaged with front wall 152A. The L-shaped bracket 152E includes a first leg 152E' and a second leg 152E" which are oriented at a right angle to one another as shown in FIG. 13. First leg 152E' extends along a rear surface of front wall 152A between cut-out 152A" and flange 152A' and is positioned such that second leg 152E" of bracket 152E projects outwardly and forwardly through cut-out 152A" in front wall 152A. First leg 152E' is welded to the rear surface of front wall 152A. Second leg 152E" extends outwardly and forwardly through the cut-out 152A" in front wall 152A and is arranged at 90° relative to a front surface of front wall 152A. Second leg 152E" projects for a distance into the gap 115 defined between the inner walls 114F of the two channel members 114. FIG. 11A shows that second leg 152E" of bracket 152E is generally triangular in shape when viewed from above. A hole 152F is defined in second leg 152E" and extends between an upper surface and lower surface thereof. The purpose of bracket 152E and hole 152F will be described later herein.

FIG. 13 shows that front wall 152A, rear wall 152B, and top wall 152C of connector frame 152 are separate components which are welded or otherwise secured to one another. Rear wall 152B, like front wall 152A, is of a height which substantially approximates the height of the second regions of the inner walls 114F of channel members 114. Rear wall 152B is a generally U-shaped member having an upper flange 152B' and a lower flange 152B" which are integrally formed with rear wall 152B and are bent to form a right angle with rear wall 152B. The upper flange 152B' is welded to an underside of top wall 152C. The lower flange 152B" forms part of the bottom wall 152D of connector frame 152. Lower flange 152B' extends forwardly towards flange 152A' of front wall 152A. Lower flange 152B" is aligned in a same plane as the bottom edge of the second regions of the inner walls 114F and will contact the ground 36 when moving apparatus 110 rests thereupon.

Top wall 152C and front wall 152A may be integrally formed from a single piece of sheet metal that is bent at a particular location to form the two surfaces. The cut-out 152A" defined in front wall 152A may be formed by making a generally V-shaped cut in the single piece of sheet metal and then bending the metal along a plane which intersects the ends of the V-shaped cut. When the bend is made in the metal, the cut-out 152A" is formed in the front wall 152A and a generally V-shaped or triangular piece of metal projects outwardly beyond the bend. This V-shaped or triangular piece of metal forms a flange 152C' (FIG. 11A) which extends outwardly and forwardly beyond a front edge of the top wall 152C. A hole 152G is defined in the flange 152C' and the hole extends from the upper surface of the flange to the bottom surface thereof. The hole 152G is located in vertical alignment with the hole 152F defined in the bracket 152E located a distance vertically below flange 152C'.

As best seen in FIG. 13, top wall 152C and rear wall 152B terminate a distance inwardly from the rear ends 114B of channel members 114. It should be understood however, that in other embodiments, rear wall 152B and the rearmost edge of top wall 152C may be flush with the rear ends 114*b* of channel members 114.

Referring now to FIG. 11, connector platform 154 is a generally U-shaped member have a front wall 154A, a rear wall 154B, and an intermediate wall 154C extending between the front wall 154A and rear wall 154B. Platform 154 further includes a first side edge 154E and a second side edge 154F. Platform 154 has a length measured between first side edge 154E and second side edge 154F that is less than a distance between the outer walls 114F of the two channel members 114 but is greater than a distance between the inner walls 114E, where the distances are measured at 90° to the outer walls and inner walls. The U-shaped platform 154 defines a platform channel 155 therein which is bounded by front wall 154A, rear wall 154B, and intermediate wall 154C. The platform channel 155 extends between first side edge 154E and second side edge 154F of platform 154. Platform channel 155 is adapted to receive at a least a portion of an article to be moved therein, as will be described later herein.

Front wall 154A defines a break 154A' therein. The break 154A' divides the front wall 154A into two sections. Platform 154 includes a tab 154G which extends outwardly from the intermediate wall and beyond the break 154A'. Tab 154G is of a substantially similar configuration to the flange 152C' provided on top wall 152C of connector frame 152. A reinforcement ring 154H is welded to the upper surface of tab 154G to reinforce a region of tab 154G which defines a through-hole 154J. The through-hole 154J extends from an upper surface of spacer 154H through to a lower surface of tab 154G. This can be seen in FIG. 13.

In other embodiments, spacer 154H may not be welded to tab 154G but may simply be used in conjunction therewith. In these instances, a hole is defined in the tab and a hole defined in the spacer is aligned with the hole in the tab.

An opening to the platform channel 155 faces upwardly such that an upper surface of the intermediate wall 154C thereof forms a bottom of the platform channel 155 into which a portion of the article to be moved is received. The front wall 154A and rear wall 154A extend vertically upwardly from the intermediate wall 154C and aid in preventing the portion of the article received therein from sliding out of the platform channel 155. The ends of the platform channel 155 proximate first side edge 154E and second side edge 154F are preferably open so that the portion of the article received therein can extend outwardly beyond the first and second side edges 154E, 154F of platform 154. It will be understood, however, that in other embodiments, one or both of the first side edge 154E and second side edge 154F may include a wall which extends upwardly from the upper surface of intermediate wall 154C and any such walls may be of any desired height with respect to intermediate wall 154C.

It should also be noted that platform 154 may be of any desired width or length, where the width is measured between front wall 154A and rear wall 154B and length is measured between first side edge 154E and second side edge 154F. Additionally, front wall 154A and rear wall 154B may be of any desired height measured from intermediate wall 154C to a top edge of the associated wall 154A, 154B. It should also be noted that while the heights of front wall 154A and rear wall 154B are illustrated as being generally the same in the attached figures, it will be understood that front wall 154A and rear wall 154B may be off different heights relative to one another. The dimensions of the particular platform 154 engaged with connector frame 152 will be selected based on the type of articles which will typically be moved utilizing moving apparatus 110. Additionally, in another embodiment, one or both of the front wall 154A and rear wall 154B may be omitted or may be differently configured from what is illustrated in the attached figures and described herein.

Pivot rod assembly 156 secures platform 154 to connector frame 152, and thereby to the two channel members 114. Pivot rod assembly 156 enables platform 154 to rotate relative to connector frame 152 about a vertical axis "V" (FIGS. 11 and 12). The vertical axis "V" is oriented at ninety degrees relative to an upper surface of the intermediate wall 154C of platform 154. The vertical axis "V" is further oriented at ninety degrees relative to top walls 114C of channel members 114 and to the longitudinal axes "Y" of those channel members 114 and of the body of moving apparatus.

Pivot rod assembly 156 may be of any desired configuration and components. An exemplary pivot rod assembly 156 is shown in the attached figures as comprising a fastener 158, a first washer 160, a spacer 162, a second washer 164, and a nut 166. Platform 154 is secured to connector frame 152 by aligning a hole in washer 160 with hole 154J in tab 154G, with hole 152G in flange 152C', with a hole in spacer 162, with hole 152F of bracket 152E, and with a hole in washer 164. The shaft of fastener 158 is then inserted through the aforementioned aligned holes and nut 166 is threadedly engaged with fastener 158 to secure platform 154 to connector frame 152. Platform 154 is engaged with connector frame 152 by way of fastener 158 such that platform 154 is able to pivot about a vertical axis "V" which extends along the shaft of fastener 158. The possible pivotal motion of platform 154 about axis "V" is shown by the arrow "N" in FIG. 12. It will be understood that platform 154 is capable of rotating through 360° about the vertical axis "V". In other embodiments, one or more stops may be provided on either channel member 114 or on connector frame 152 to limit the possible rotation of platform 154 to less than 360°.

Moving apparatus 110 is engaged with a forklift 12 or other lifting device/vehicle in exactly the same manner as moving apparatus 10 is engaged with forklift 12. In brief, moving apparatus 110 is placed on the ground or a surface 36 and when this occurs, the retaining assembly 116 is in the open position and so tines 12A of a forklift carriage 12B are able to be inserted into the guided channel 114H defined by each channel member 114. When forklift carriage 12B is raised off the ground 36, the retaining assembly 116 rotates into a closed position. In the closed position, tines 12A are prevented from being withdrawn from guided channels 114H by base 17A of the associated arm member 116A, 116B. Moving apparatus 110 is thereby secured to forklift carriage 12A and will move in unison therewith.

Figure 14:
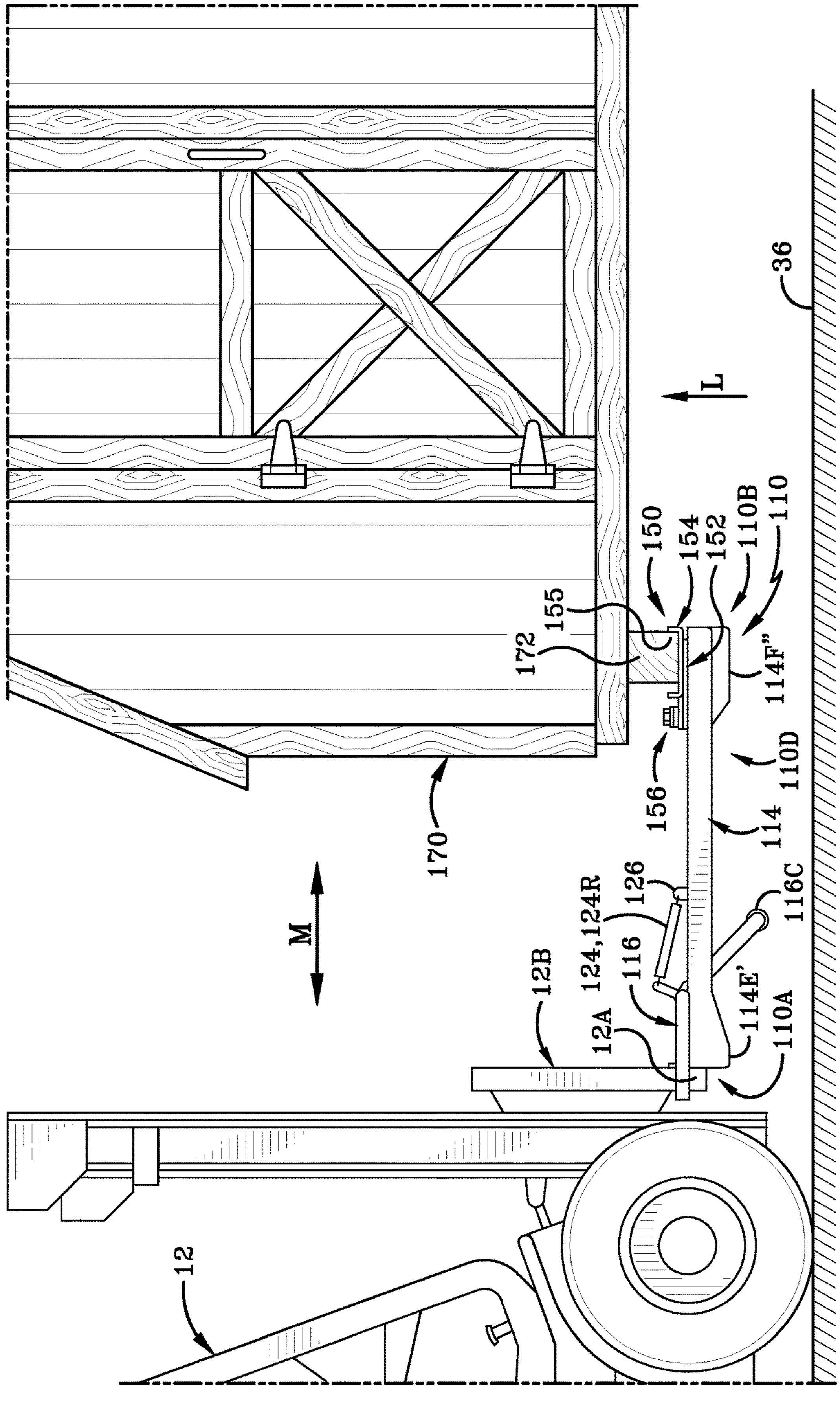
FIG. 14 is a right side elevation view of the moving apparatus of FIG. 11 with an article to be moved operatively engaged with the connector plate and the article being lifted and manipulated by the forklift to which the moving apparatus is attached.

Moving apparatus 110 is able to be used to manipulate and maneuver various articles, such as the shed 170 shown in FIG. 14. Shed 170 is provided with a support beam 172 which may be received within the platform channel 155 (FIG. 13) defined by intermediate wall 154C, front wall 154A, and rear wall 154B of platform 154. Once support beam 172 is received within the platform channel 155 of platform 154, forklift 12 may be actuated to move shed 170 across the ground 36 as indicated by arrow "M" in FIG. 14. The operator of the forklift may not need to get out of the vehicle in order to be able to engage and manipulate the object to be moved.

In some instances, beam 172 may be secured to platform 154 by appropriate clamps (not shown) or any other type of securement device. In other instances, an article to be moved may be directly secured to platform in any other appropriate manner such as by clamps or fasteners. Platform 154 is able to pivot about axis "V" as necessary during an operation for moving shed 170 (or some other object, article or equipment.

While platform 154 has been disclosed herein as being a generally U-shaped component, it will be understood that in other instances platform may be a flat component which has securement holes formed therein and through which fasteners may be received to retain an article to the platform.

A method of using moving apparatus 110 to move an article, such as shed 170, from a first location to a second location with a lifting device 12, is described hereafter. The method includes placing the moving apparatus 110 onto a surface 36 at the first location; receiving a portion of the article to be moved, such as the beam 172 at the base of shed 170, within a platform channel 155 defined by a platform 154 which is rotatably engaged with a body of the moving apparatus 110. Before or after receiving the portion of the article into platform channel 155, the method includes lifting the moving apparatus 110 off the surface 36 with the lifting device 12, as indicated by the arrow "L" in FIG. 14. The method further includes moving a retaining assembly 116 on the body of the moving apparatus 110 from an accepting position (shown in FIG. 11) to an engaged position (shown in FIG. 14) as the moving apparatus 110 is lifted off the surface 36 by lifting device 12. The moving of the retaining assembly 16 from the accepting position to the engaged position has been described earlier herein and the movement of retaining assembly 116 from the accepting position to the engaged position is identical to that of retaining assembly 16. As the retaining assembly 116 moves to the engaged position, the retaining assembly 116 secures the body of the moving apparatus 110 to the lifting device 12. In particular, the retaining assembly 116 secures the body of the moving apparatus to the lifting device 12 because the base 17A of each arm member 116A, 116B prevents the tine 12A of the lifting device 12 from being withdrawn from the associated guided channel 114H.

Once the moving apparatus 110 is secured to the lifting device 12 via the retaining assembly 116, the method further includes moving the lifting device 12 from the first location to a remote second location. In the case of the lifting device 12 being a forklift 12, moving the lifting device 12 between the two locations means driving the forklift from one location to another while keeping the moving apparatus 110 secured to the lifting device 12. The moving apparatus 110 is kept secured to the lifting device by holding the moving apparatus 110 a distance vertically above the surface 36 as the lifting device 12 travels between the two locations.

When placing the portion of the article, such as beam 172 of shed 170, into the platform channel 155 defined by the platform 154, the method may include rotating the platform 154 relative to connector frame 152 of the body of the moving apparatus 110. The connector frame 152 is engaged with the at least one channel member 114. The method further includes orienting the platform 154 to a desired position relative to the connector frame 152 by rotating the platform 154 in order to suitably accept the portion 172 of the article 170 within the platform channel 155. The platform 154 is rotated about a pivot axis "V" oriented at ninety degrees relative to an upper surface of the intermediate wall 154C of platform 154 which defines the platform channel 155. Once the lifting apparatus arrives at the second location, the method includes lowering the moving apparatus 110 back into contact with the surface 36 at the second location and moving the retaining assembly 116 from the engaged position (FIG. 14) back to the accepting position (FIG. 11) as the moving apparatus contacts the surface 35. The retaining assembly 116 moving back into the accepting position releases the body of the moving apparatus 110 from the lifting apparatus 12. The article 170 is then able to be removed from the moving apparatus 110 by lifting the portion 172 of the article 170 from within the platform channel 155 defined by the rotatable platform 154. The moving apparatus 110 may then be reengaged and secured to the lifting device 12 and be moved to another location to aid in moving other articles.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The device, assembly, system, or method of the present disclosure may additionally include one or more sensor to sense or gather data pertaining to the surrounding environment or operation of the device, assembly, system, or method. Some exemplary sensors capable of being electronically coupled with the device, assembly, system, or method of the present disclosure (either directly connected to the device, assembly, system, or method of the present disclosure or remotely connected thereto) may include but are not limited to: accelerometers sensing accelerations experienced during rotation, translation, velocity/speed, and location traveled.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A moving apparatus for engagement with a lifting device to move an article from a first location to a second location, said moving apparatus comprising:

- a body having a first end and a second end defining a longitudinal direction therebetween;
- at least one channel member provided on the body, said at least one channel member extending in the longitudinal direction;
- a guided channel defined by each of the at least one channel member, said guided channel defining an opening at a first end and being adapted to receive a tine of the lifting device therein through the opening;
- a retaining assembly engaged with the at least one channel member and being movable between an accepting position and an engaged position;
  - wherein when the retaining assembly is in the accepting position, the guided channel is adapted to removably accept the tine of the lifting device therein;
  - wherein when the retaining assembly is in the engaged position, the tine of the lifting device is retained in the guided channel and the body is secured to the lifting device;
  - wherein the retaining assembly comprises at least one arm member having a base positionable a distance outwardly beyond the first end of the at least one channel member, wherein the base is located below the opening when the retaining assembly is in the accepting position and the base is located above an imaginary plan extending along a top wall of the at least one channel member when the retaining assembly is in the engaged position; and
- a connector assembly provided on the body, said connector assembly comprising a platform rotatable about a pivot axis, wherein the platform is adapted to engage the article to be moved.

2. The moving apparatus according to claim 1, wherein the connector assembly further comprises a connector frame engaged with the at least one channel member; and wherein the platform is rotatable relative to the connector frame.

3. The moving apparatus according to claim 2, wherein the platform is located vertically above the connector frame.

4. The moving apparatus according to claim 2, wherein the connector assembly further comprises a pivot rod extending between the connector frame and the platform, and wherein the pivot axis extends along a shaft of the pivot rod.

5. The moving apparatus according to claim 1, wherein the pivot axis is oriented at ninety degrees relative to a longitudinal axis of the at least one channel member, and the longitudinal axis extends between a first end and a second end of the at least one channel member.

6. The moving apparatus according to claim 1, wherein the platform is U-shaped in cross-section and defines a platform channel therein, and wherein the platform channel is adapted to receive a portion of the article to be moved therein.

7. The moving apparatus according to claim 1, further comprising a biasing assembly engaged with the retaining assembly, wherein said biasing assembly urges the retaining assembly into the engaged position.

8. The moving apparatus according to claim 1, wherein the retaining assembly further comprises a leg extending outwardly from one end of the base, wherein the leg is V-shaped and an apex of the V-shaped leg is pivotally secured to the at least one channel member.

9. A moving apparatus for engagement with a lifting device to move an article from a first location to a second location, said moving apparatus comprising:

- a body including a first channel member and a second channel member spaced laterally apart from one another, wherein each of the first channel member and second channel member has a first end and a second end spaced longitudinally apart from one another, and wherein the body is adapted to be engaged with the lifting device;
- a retaining assembly engageable with the body, wherein the retaining assembly comprises:
  - a first arm engaged with each of the first and second channel members, wherein the first arm is of an inverted V-shape having a first end, a second end longitudinally remote from the first end, and an apex located between the first end and the second end;
  - wherein the apex of the first arm is pivotally engaged with the associated first channel member or second channel member via a pivot rod extending from a first side of the first arm;
  - a first plate extending laterally outwardly from the first side of the first arm proximate the first end thereof;
  - wherein the first plate is located a distance outwardly beyond the first end of the associated first channel member or second channel member which receives a tine of the lifting device therein;
  - a connector assembly comprising:
    - a connector frame extending laterally between the first channel member and the second channel member, wherein the connector frame is located longitudinally between the first and second ends of the first and second channel members; and
    - a platform rotatably engaged with the connector frame, said platform being adapted to engage the article to be moved.

10. The moving apparatus according to claim 9, wherein the connector frame is engaged with a top wall of each of the first and second channel members and wherein the platform is located vertically above the connector frame.

11. The moving apparatus according to claim 9, wherein the connector frame further comprises a pivot rod oriented at ninety degrees relative to an upper surface of the platform.

12. The moving apparatus according to claim 11, wherein the pivot rod is located between the first and second channel members and at a distance longitudinally between the first and second ends of the first and second channel members.

13. The moving apparatus according to claim 9, wherein the platform is rotatable relative to the connector frame about a pivot axis extending at ninety degrees relative to a longitudinal axis of the first channel member, where the longitudinal axis extends between the first end and second end of the first channel member.

14. The moving apparatus according to claim 9, further comprising a hitch assembly extending outwardly beyond the second ends of the first and second channel members.

15. A method for moving an article from a first location to a second location with a lifting device, said method comprising:

placing a moving apparatus onto a surface at the first location;

extending a connector frame between a first channel member and a second channel member of a body of the moving apparatus;

extending a bracket outwardly from the connector frame and into a space bounded and defined by the first channel member, the second channel member and the connector frame;

rotatably engaging a platform to the bracket via a pivot rod;

receiving a portion of the article to be moved within a platform channel defined by the platform;

pivotally engaging an arm having an inverted V-shape with each of the first channel member and the second channel member;

extending a plate at a first end of the arm outwardly beyond a first end of an associated one of the first channel member and the second channel member;

inserting a tine of the lifting device through an opening defined in the first end of the associated one of the first channel member and the second channel member;

lifting the moving apparatus off the surface with the lifting device;

rotating the arms engaged with the first and second channel members to an engaged position;

securing the body of the moving apparatus to the lifting device with the arms of the retaining assembly while in the engaged position;

moving the lifting device from the first location to the second location; and moving the article from the first location to the second location with the moving apparatus while secured to the lifting device and while held a distance above the surface.

16. The method according to claim 15, further comprising:

rotating the platform relative to the connector frame of the body; and orienting the platform to a desired position relative to the connector frame in order to suitably accept the portion of the article therein.

17. The method according to claim 16, further comprising rotating the platform about a pivot axis extending along the pivot rod, wherein the pivot axis is oriented at ninety degrees relative to an upper surface of the platform which defines the platform channel.

18. The method according to claim 15, further comprising:

lowering the moving apparatus back into contact with the surface at the second location;

moving the arms of the retaining assembly from the engaged position to an accepting position as the moving apparatus is lowered back into contact with the surface;

releasing the body of the moving apparatus from the lifting device as the retaining assembly moves to the accepting position;

removing the article from the moving apparatus by lifting the portion of the article from within the platform channel defined by the rotatable platform.

19. The moving apparatus according to claim 9, further comprising:

a tab extending outwardly from the platform and into a space defined between the first and second channel members;

a bracket extending outwardly from the connector frame and into the space defined between the first and second channel members;

a pivot rod extending between the bracket and the tab; and wherein the platform is rotatably engaged with the connector frame via the pivot rod.

* * * * *